(12) United States Patent
Takahashi

(10) Patent No.: US 9,354,442 B2
(45) Date of Patent: May 31, 2016

(54) OPTICAL SCANNING DEVICE AND SCANNING INSPECTION APPARATUS

(71) Applicant: OLYMPUS CORPORATION, Tokyo (JP)

(72) Inventor: Shintaro Takahashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 307 days.

(21) Appl. No.: 13/939,286

(22) Filed: Jul. 11, 2013

(65) Prior Publication Data

US 2013/0301096 A1 Nov. 14, 2013

Related U.S. Application Data

(63) Continuation of application No. PCT/JP2012/050932, filed on Jan. 18, 2012.

(30) Foreign Application Priority Data

| Jan. 18, 2011 | (JP) | 2011-007966 |
| Feb. 25, 2011 | (JP) | 2011-040895 |
| Feb. 25, 2011 | (JP) | 2011-040896 |
| Sep. 15, 2011 | (JP) | 2011-201948 |

(51) Int. Cl.
*G02B 26/08* (2006.01)
*G02B 26/10* (2006.01)
*G01B 11/24* (2006.01)

(52) U.S. Cl.
CPC .............. *G02B 26/105* (2013.01); *G01B 11/24* (2013.01)

(58) Field of Classification Search
CPC .. G02B 21/0032; G02B 26/105; G02B 26/08; G02B 26/0816; G02B 27/26; G02B 27/283; G02B 27/106; G02B 17/00; G01B 11/24

USPC ........... 359/204.1–204.3; 356/491–492, 496, 356/511, 608, 629; 73/618, 620

See application file for complete search history.

(56) References Cited

U.S. PATENT DOCUMENTS

| 5,325,381 A * | 6/1994 | Paoli ...................... H04N 1/506 359/204.1 |
| 6,222,663 B1 * | 4/2001 | Plotkin .................... G02B 5/09 347/241 |
| 2011/0318057 A1 * | 12/2011 | Watanabe ............ G02B 26/127 399/151 |

FOREIGN PATENT DOCUMENTS

| JP | 59-038721 A | 3/1984 |
| JP | 59-193413 A | 11/1984 |

(Continued)

OTHER PUBLICATIONS

International Search Report dated May 1, 2012 issued in PCT/JP2012/050932.

*Primary Examiner* — James Phan
(74) *Attorney, Agent, or Firm* — Scully, Scott, Murphy & Presser, P.C.

(57) ABSTRACT

A scanning rate is increased without causing the light utilization efficiency to decrease. An optical scanning device includes a polarization switching unit that switches the polarization direction of a beam at a predetermined switching timing; at least one polarization beam splitter that splits the beam into two optical paths in accordance with the polarization direction switched by the polarization switching unit; a reflecting optical system that causes the beams split by the polarization beam splitter to have relative angles in the same plane so as to make the beams meet at the same location; and a scanner that scans the beams made to meet at the same location by means of the reflecting optical system in a direction parallel to the plane in synchronization with the switching timing of the polarization switching unit.

10 Claims, 14 Drawing Sheets

(56) References Cited

FOREIGN PATENT DOCUMENTS

| | | | |
|---|---|---|---|
| JP | 05-173085 A | 7/1993 |
| JP | 08-015155 A | 1/1996 |
| JP | 08-285697 A | 11/1996 |
| JP | 2006-221190 A | 8/2006 |
| JP | 2007-061855 A | 3/2007 |

* cited by examiner

OPTICAL SCANNING DEVICE AND SCANNING INSPECTION APPARATUS

CROSS REFERENCE TO RELATED APPLICATIONS

This is a continuation of International Application PCT/JP2012/050932, with an international filing date of Jan. 18, 2012, which is hereby incorporated by reference herein in its entirety. This application claims the benefit of Japanese Patent Application Nos. 2011-007966, 2011-040895, 2011-040896, and 2011-201948, the contents of which are incorporated herein by reference.

TECHNICAL FIELD

The present invention relates to optical scanning devices and scanning inspection apparatuses.

BACKGROUND ART

In the related art, an optical scanning device that can substantially increase the scanning rate of laser light is known (for example, see Patent Literature 1). The optical scanning device discussed in Patent Literature 1 includes a beam splitter that reflects and transmits a laser beam so as to split the laser beam; a half mirror that reflects the laser beam transmitted through the beam splitter; a scanner that scans the laser beams reflected at different output angles from the beam splitter and the half mirror; and a diaphragm that selectively allows the laser beams scanned by the scanner to pass therethrough.

The optical scanning device discussed in Patent Literature 1 makes the scanner simultaneously scan the laser beams reflected by the beam splitter and the half mirror and allows only one of the laser beams to pass sequentially through the diaphragm so that multiple light beams are sequentially scanned in a single scanning process of the scanner, thereby shortening the time required for scanning a specific area.

CITATION LIST

Patent Literature

{PTL 1}
Japanese Unexamined Patent Application Publication No. Hei 5-173085

SUMMARY OF INVENTION

Technical Problem

The present invention provides an optical scanning device and a scanning inspection apparatus that can increase the scanning rate without causing the light utilization efficiency to decrease.

Furthermore, the present invention provides an optical scanning device and a scanning inspection apparatus that allow for an improved scanning rate while aligning focal planes in a sample.

Furthermore, the present invention provides an optical scanning device and a scanning inspection apparatus that allow for an improved scanning rate while preventing brightness variations on a scan surface by means of a simple configuration.

Solution to Problem

A first aspect of the present invention provides an optical scanning device including a polarization switching unit that switches a polarization direction of a laser beam at a predetermined switching timing; at least one splitting unit that splits the laser beam into two optical paths in accordance with the polarization direction switched by the polarization switching unit; a beam-angle setting unit that causes the laser beams split by the splitting unit to have relative angles in a single plane so as to make the laser beams meet at a single location; and a scanning unit that scans the laser beams made to meet at the single location by means of the beam-angle setting unit in a direction parallel to the plane in synchronization with the switching timing.

A second aspect of the present invention provides a scanning inspection apparatus including the aforementioned optical scanning device; an observation optical system that radiates the laser beams scanned by the optical scanning device onto a subject; and a detecting unit that detects light from the subject irradiated with the laser beams from the observation optical system.

A third aspect of the present invention provides an optical scanning device including at least one splitting unit that splits an input laser beam into two optical paths; a beam-angle setting unit that causes the laser beams split by the splitting unit to have relative angles in a single plane so that the laser beams have identical optical-path lengths and are made to meet at a single location; and a scanning unit that simultaneously scans the laser beams made to meet at the single location by means of the beam-angle setting unit in a direction parallel to the plane.

A fourth aspect of the present invention provides a scanning inspection apparatus including the aforementioned optical scanning device; an observation optical system that radiates the laser beams scanned by the optical scanning device onto a subject; and a detecting unit that detects light from the subject irradiated with the laser beams from the observation optical system.

A fifth aspect of the present invention provides an optical scanning device including a polarization-direction adjusting unit that is capable of adjusting a polarization direction of a laser beam; at least one splitting unit that splits the laser beam whose polarization direction has been adjusted by the polarization-direction adjusting unit into two optical paths of polarized components that are orthogonal to each other; a beam-angle setting unit that causes the laser beams split by the splitting unit to have relative angles in a single plane so as to make the laser beams meet at a single location; and a scanning unit that scans the laser beams made to meet at the single location by means of the beam-angle setting unit in a direction parallel to the plane.

A sixth aspect of the present invention provides a scanning inspection apparatus including the aforementioned optical scanning device; an observation optical system that radiates the laser beams scanned by the optical scanning device onto a subject; and a detecting unit that detects light from the subject irradiated with the laser beams from the observation optical system.

DESCRIPTION OF EMBODIMENTS

First Embodiment

An optical scanning device according to a first embodiment of the present invention will be described below with reference to the drawings.

Figure 1:
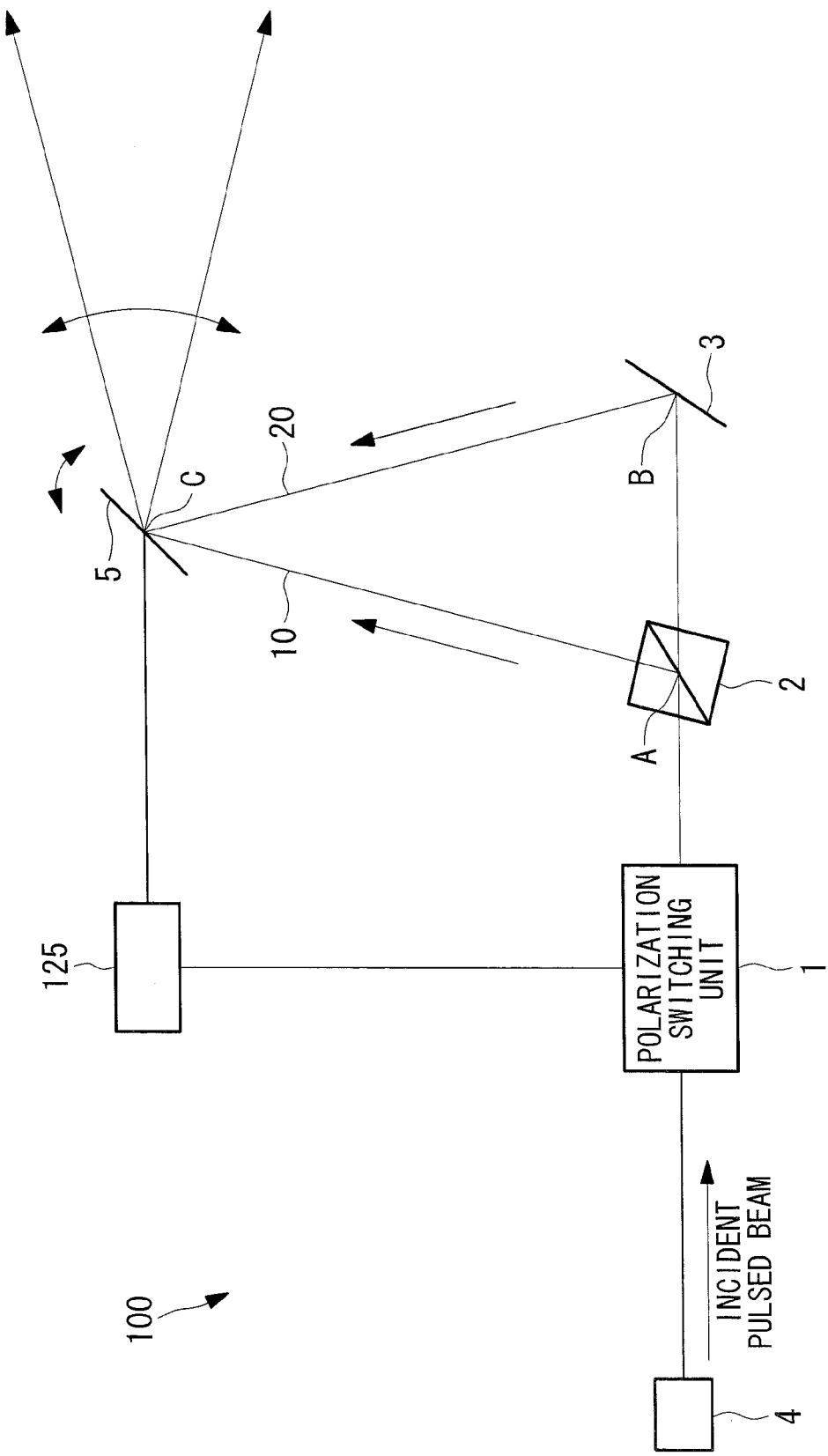
FIG. 1 schematically illustrates the configuration of an optical scanning device according to a first embodiment of the present invention.

As shown in FIG. 1, an optical scanning device 100 according to this embodiment includes a polarization switching unit 1 that switches the polarization direction of a beam (laser beam) emitted from a light source 4; a polarization beam splitter (splitting unit) 2 that splits the beam into two optical paths in accordance with the polarization direction switched by the polarization switching unit 1; a reflecting optical system (beam-angle setting unit) 3 that reflects one of the beams split by the polarization beam splitter 2; a scanner (scanning unit) 5, such as a galvanometer mirror, which scans the beams split by the polarization beam splitter 2; and a control unit 125 that synchronizes the polarization-direction switching timing of the polarization switching unit 1 with the scanning timing of the scanner 5.

In FIG. 1, a point where the principal ray of the beam emitted from the light source 4 intersects with a reflecting surface of the polarization beam splitter 2 will be defined as point A. Furthermore, a point where the principal ray of the beam emitted from the light source 4 intersects with a reflecting surface of the reflecting optical system 3 will be defined as point B. The principal ray of a reflected beam from the polarization beam splitter 2 and the principal ray of a reflected beam from the reflecting optical system 3 intersect at a single point on a reflecting surface of the scanner 5, which is for scanning the beams along a trajectory that is to be optically scanned. This intersecting point will be defined as point C.

The light source 4 is configured to emit a linearly-polarized beam.

The polarization switching unit 1 is capable of arbitrarily setting the polarization direction of an incident beam. For example, the polarization switching unit 1 is capable of switching the polarization direction of the beam between two polarized components (an s-polarized component and a p-polarized component) that are orthogonal to each other at a predetermined switching timing. For example, a photoelastic element or an electro-optic crystal may be used as the polarization switching unit 1.

The polarization beam splitter 2 serves as a splitting unit that separates the polarized components from each other and makes the different polarized beam components travel separately along two different optical paths, that is, an optical path A-C (referred to as "optical path 10" hereinafter) and an optical path A-B-C (referred to as "optical path 20" hereinafter). When receiving an s-polarized beam, the polarization beam splitter 2 reflects the beam toward the scanner 5. When receiving a p-polarized beam, the polarization beam splitter 2 transmits the beam.

The reflecting optical system 3 is disposed in the optical path of the p-polarized beam transmitted through the polarization beam splitter 2. The reflecting optical system 3 gives the optical path 20 an angle relative to the optical path 10 and reflects the beam coming from the polarization beam splitter 2 so that the principal rays traveling along the two optical paths meet at point C. Specifically, the reflecting optical system 3 reflects the p-polarized beam toward the scanner 5 along a plane that is shared with the s-polarized beam, and causes the p-polarized beam to be incident on the scanner 5 at a position that is the same as the incident position of the s-polarized beam. Thus, the split beams traveling along the two optical paths are given relative angles in the same plane so as to meet at the same location on the scanner 5.

When actuated by the control unit 125, the scanner 5 rotates parallel to the aforementioned plane extending along the incident beams in synchronization with the polarization-direction switching timing of the polarization switching unit 1. Thus, the scanner 5 can scan the s-polarized beam and the p-polarized beam, which are incident on the same location at different angles in the same plane, in a direction parallel to the plane.

The optical scanning device 100 having the above-described configuration can freely switch between two kinds of optical paths by properly setting the polarization direction at the polarization switching unit 1. Specifically, by setting the polarization direction for an incident beam at the polarization switching unit 1 to a polarization direction that corresponds to a component to be reflected by the polarization beam splitter 2, the beam would be made to travel along the optical path 10. In contrast, by setting the polarization direction to a polarization direction that corresponds to a component to be transmitted through the polarization beam splitter 2, the beam would be made to travel along the optical path 20. Consequently, for example, of the two kinds of beams with different angles to be scanned by the scanner 5, a beam to be scanned within a certain angular range θ can be selected alone.

Next, the operation of the optical scanning device 100 according to this embodiment will be described.

In order to scan a beam at high speed by using the optical scanning device 100 according to this embodiment, the polarization switching unit 1 first switches the polarization direction of a beam emitted from the light source 4 between an s-polarized component and a p-polarized component at high speed.

Figure 2:
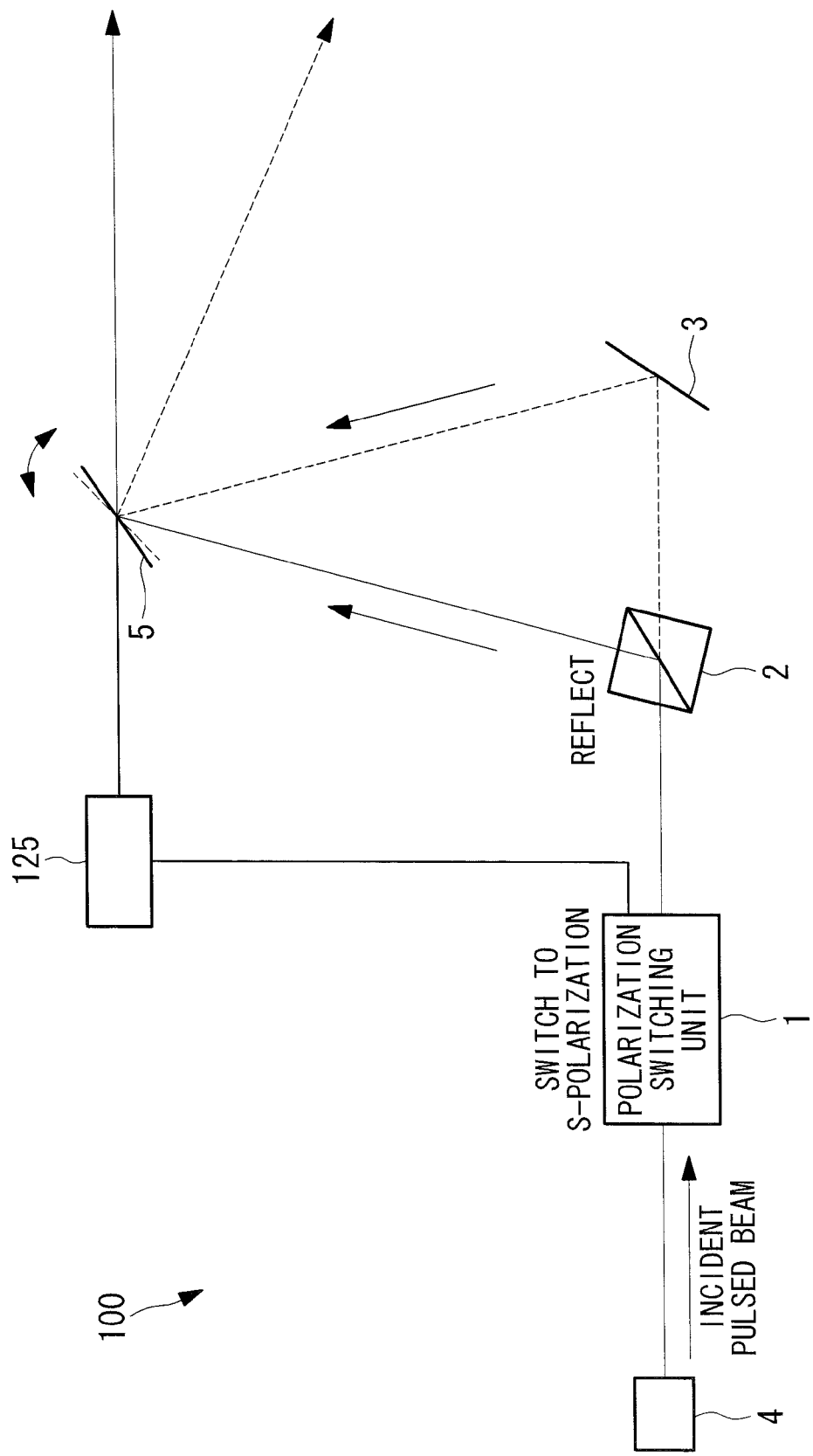
FIG. 2 illustrates how an s-polarized beam is scanned by the optical scanning device in FIG. 1.
Figure 3:
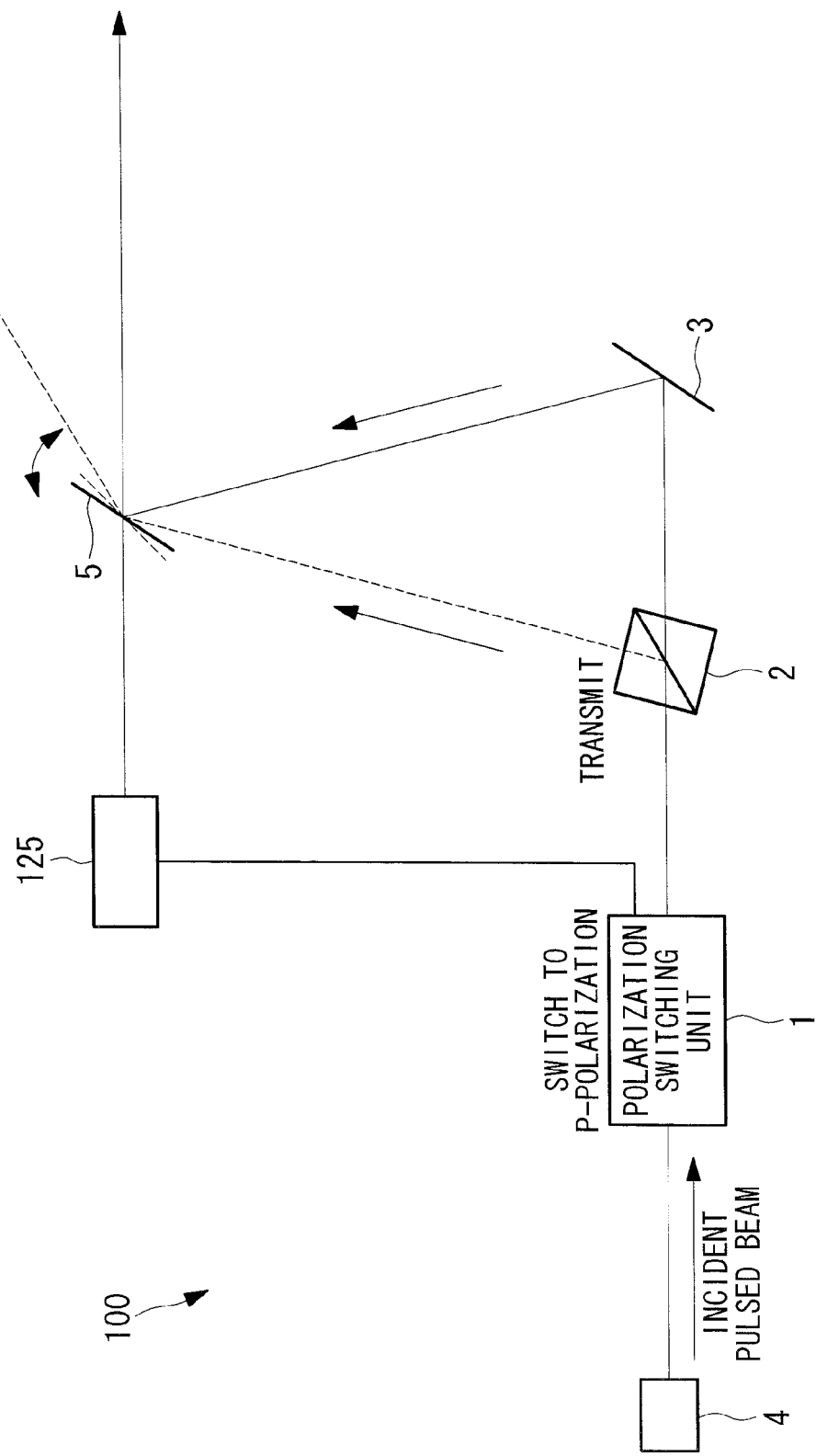
FIG. 3 illustrates how a p-polarized beam is scanned by the optical scanning device in FIG. 1.

For example, as shown in FIG. 2, when the beam is switched to an s-polarized component by the polarization switching unit 1, the beam is reflected toward the scanner 5 by the polarization beam splitter 2. On the other hand, as shown in FIG. 3, when the beam is switched to a p-polarized component by the polarization switching unit 1, the beam is transmitted through the polarization beam splitter 2 and is reflected toward the scanner 5 by the reflecting optical system 3.

The s-polarized beam from the polarization beam splitter 2 and the p-polarized beam from the reflecting optical system 3 are given relative angles in the same plane and alternately become incident at the same location on the scanner 5 in accordance with the polarization-direction switching timing of the polarization switching unit 1. Furthermore, these beams are scanned by the scanner 5 in a direction parallel to the aforementioned plane.

In this case, the operation of the control unit 125 causes the scanner 5 to scan the beams in synchronization with the polarization-direction switching timing of the polarization switching unit 1 so that the split beams can be sequentially scanned over the same area at certain time intervals in accordance with their angles of incidence on the scanner 5. Furthermore, by using the polarization beam splitter 2 to split the beam in accordance with the polarization direction, the intensity of each split beam can be maintained at the same level as the intensity of the beam before it is split.

Consequently, with the optical scanning device 100 according to this embodiment, the polarization direction of a beam is instantaneously and successively switched by the polarization switching unit 1, thereby achieving an improved scanning rate without causing the utilization efficiency of the beam to decrease.

Furthermore, according to this embodiment, the beams can be distributed continuously in a certain order to desired positions on a subject by switching the optical paths of the beams by means of the polarization switching unit 1. This not only allows for high-speed scanning, but also allows a detector to detect an optical response from a radiated area without overlapping. Furthermore, since the intensity of each of the beams alternately split by means of the polarization beam splitter 2 does not decrease and is maintained at the same level as the intensity of the beam before it is split regardless of the number of splitting locations, a high-output optical response can be obtained from a subject, and a deeper area inside the subject can be sufficiently irradiated with light. Furthermore, when observing the subject, the subject can be optically scanned at high speed while maintaining the brightness of the optical response in accordance with radiated light. Thus, the device is suitable for observing or analyzing a morphological or biochemical change in, for example, a biological organism.

In this embodiment, for example, the optical scanning device 100 may include another scanner (another scanning unit, not shown) that scans the beams scanned by the scanner 5 in a direction orthogonal to the scanning direction of the scanner 5.

Accordingly, the beams scanned continuously over the same area in one direction by the scanner 5 can be sequentially scanned by the other scanner in the direction orthogonal to this direction, thereby allowing for an improved two-dimensional scanning rate of the beams.

Although one set consisting of a polarization switching unit and a polarization beam splitter is provided as an example in this embodiment, multiple sets consisting of polarization switching units and polarization beam splitters may alternatively be provided. For example, as shown in FIG. 4, the device may include a first polarization switching unit 1A that switches the polarization direction of a beam from the light source 4; a first polarization beam splitter 2A that reflects an s-polarized beam, when received from the first polarization switching unit 1A, toward the scanner 5 and transmits a p-polarized beam, when received from the first polarization switching unit 1A; a second polarization switching unit 1B that switches the polarization direction of the beam transmitted through the first polarization beam splitter 2A; and a second polarization beam splitter 2B that reflects the s-polarized beam, when received from the second polarization switching unit 1B, toward the scanner 5 and transmits the p-polarized beam, when received from the second polarization switching unit 1B.

Figure 4:
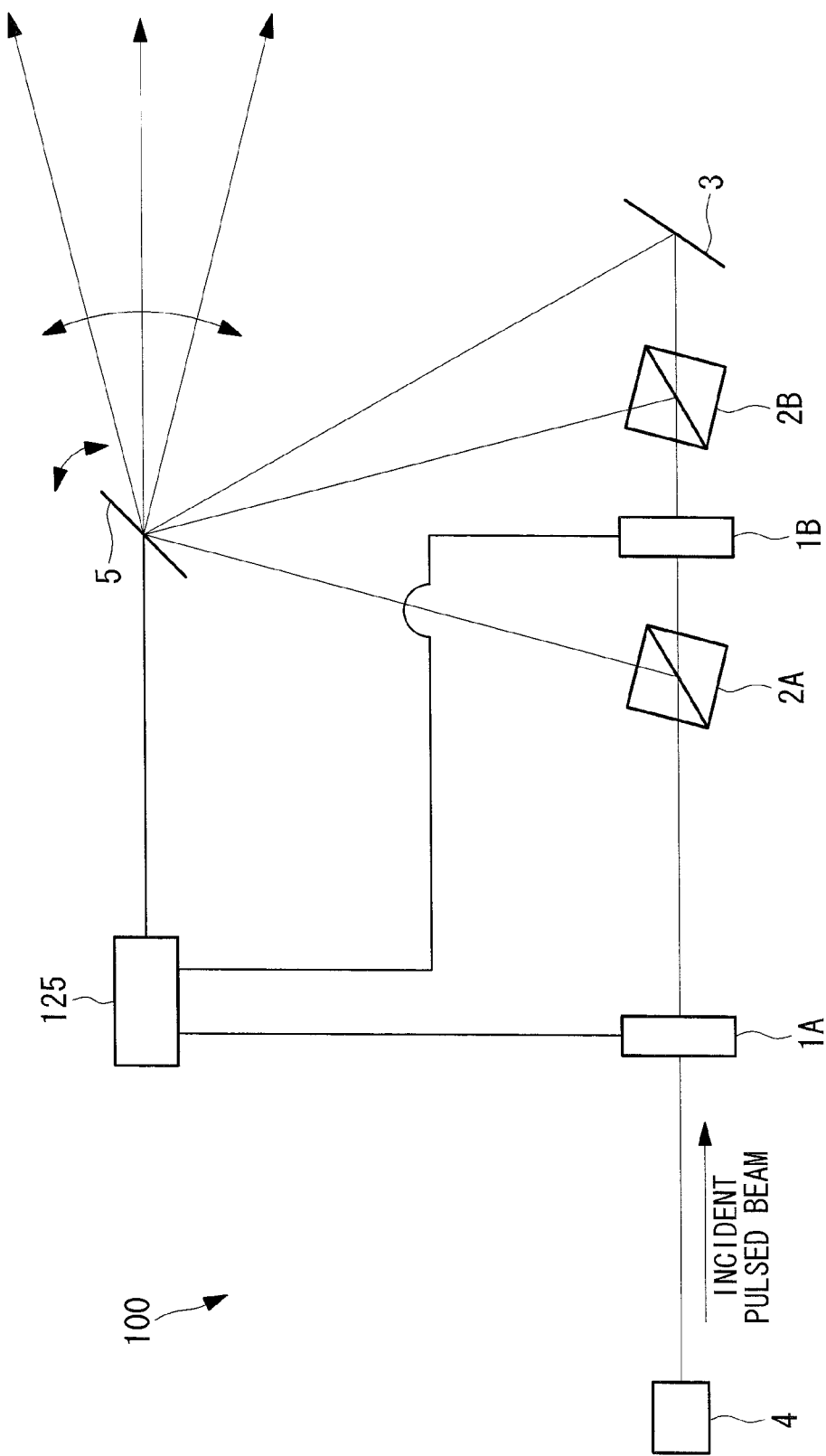
FIG. 4 schematically illustrates the configuration of an optical scanning device equipped with multiple polarization switching units and splitting units according to a modification of the first embodiment of the present invention.

In the case where the optical scanning device 100 is equipped with two sets consisting of polarization switching units and polarization beam splitters, as shown in FIG. 4, a laser beam can be split into three kinds of optical paths at certain time intervals by switching the polarization direction by means of the polarization switching units 1A and 1B. In this case, with the operation of the control unit 125, the switching timing of the first polarization switching unit 1A and the switching timing of the second polarization switching unit 1B may be synchronized with the scanning timing of the scanner 5.

Furthermore, in this embodiment, the light source 4 may emit a circularly-polarized beam, and a polarizer (not shown), such as a quarter-wave plate, may be provided in front of the polarization switching unit 1 or between the polarization switching unit 1 and the polarization beam splitter 2.

Accordingly, even when a circularly-polarized light source is used, a linearly-polarized beam whose polarization direction has been switched by the polarization switching unit 1 can be made to enter the polarization beam splitter 2.

Second Embodiment

Next, an optical scanning device according to a second embodiment of the present invention will be described with reference to FIG. 5.

An optical scanning device 110 according to this embodiment includes half-wave plates 107 and 109 that change the polarization direction of beams that have been split by a polarization beam splitter (splitting unit) 111; pairs of mirrors (beam-angle setting units) 13 and 14 that deflect the beams whose polarization direction has been changed by the half-wave plates 107 and 109; a polarization beam splitter (beam-angle setting unit) 112 that merges the optical paths of the deflected beams; a collimating lens (beam-angle setting unit) 16; and a converging lens 21 that converges the beams scanned by the scanner 5. Reference numeral 15 denotes a converging lens that converges a beam emitted from the light source 4.

Sections with configurations similar to those in the optical scanning device 100 according to the first embodiment are given the same reference numerals, and descriptions thereof will be omitted.

Figure 5:
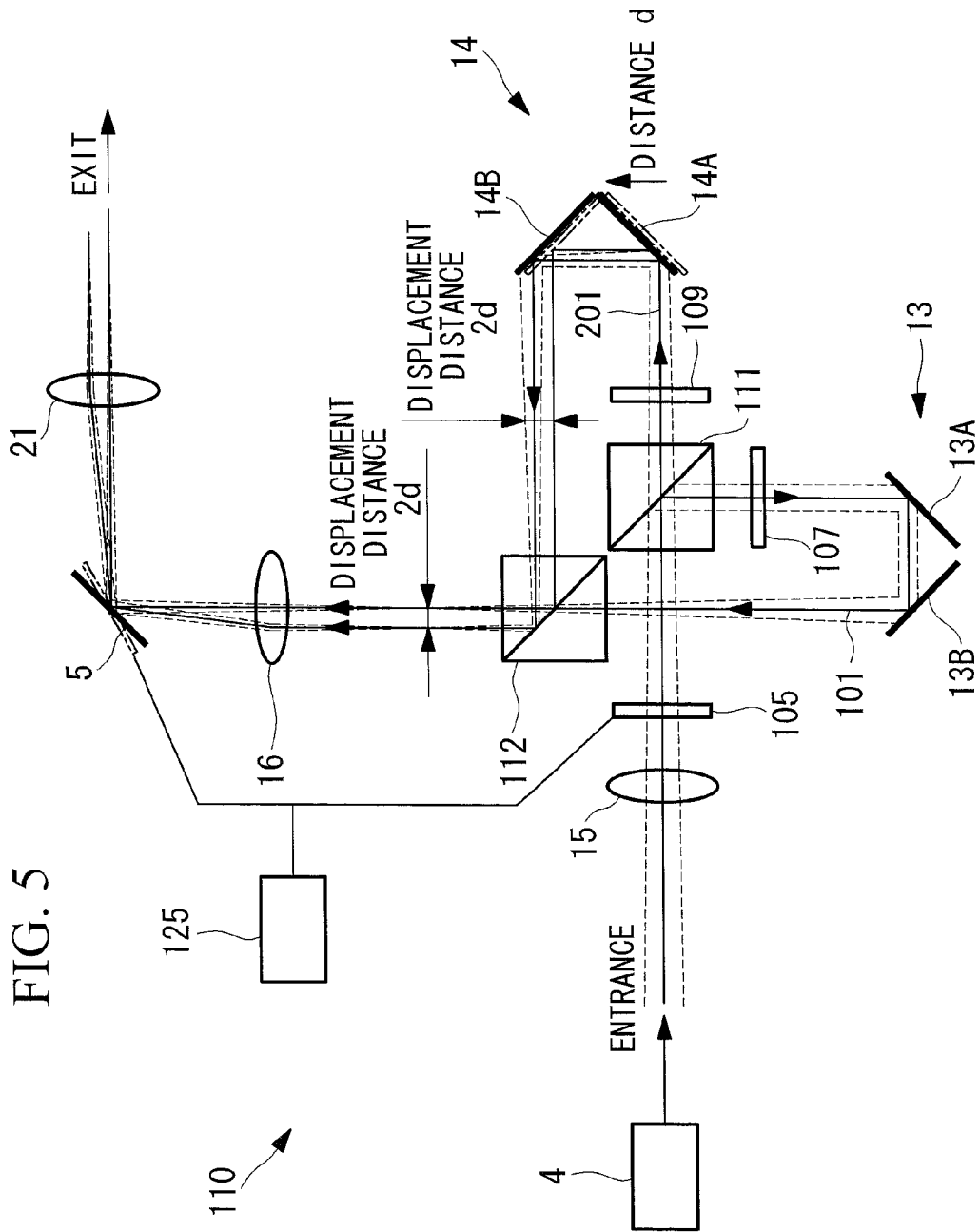
FIG. 5 schematically illustrates the configuration of an optical scanning device according to a second embodiment of the present invention.

Referring to FIG. 5, with regard to a beam incident on the polarization beam splitter 111, a beam component thereof is reflected by the polarization beam splitter 111 and then enters the polarization beam splitter 112 via the pair of mirrors 13. The optical path of this beam component will be defined as an optical path 101. On the other hand, the other beam component is transmitted through the polarization beam splitter 111 and then enters the polarization beam splitter 112 via the pair of mirrors 14. The optical path of this beam component will be defined as an optical path 201.

The polarization beam splitter 111 is configured to reflect an s-polarized beam at a right angle toward the pair of mirrors 13 and transmit a p-polarized beam.

The half-wave plates 107 and 109 are configured to rotate the polarization direction of a linearly-polarized beam by 90° while maintaining the linearly-polarized state thereof. Specifically, the half-wave plate 107 is disposed between the polarization beam splitter 111 and the pair of mirrors 13 and is configured to change the beam reflected by the polarization beam splitter 111 from an s-polarized component to a p-polarized component. On the other hand, the half-wave plate 109 is disposed between the polarization beam splitter 111 and the pair of mirrors 14 and is configured to change the beam transmitted through the polarization beam splitter 111 from a p-polarized component to an s-polarized component.

The pair of mirrors 13 serves as a reflecting optical system that causes the beam reflected by the polarization beam splitter 111 to enter the polarization beam splitter 112. The pair of mirrors 13 is constituted of one set consisting of a first fixed mirror (beam-angle setting unit) 13A and a second fixed mirror (beam-angle setting unit) 13B. The first fixed mirror 13A and the second fixed mirror 13B are disposed facing the polarization beam splitters 111 and 112, respectively, and are fixed at predetermined angles.

The first fixed mirror 13A is disposed at a position where it reflects the beam transmitted through the half-wave plate 107 at a right angle toward the second fixed mirror 13B. The second fixed mirror 13B is disposed at a position where it reflects the incoming beam from the first fixed mirror 13A at a right angle toward the polarization beam splitter 112. In other words, the pair of mirrors 13 is capable of deflecting the incoming beam traveling from the polarization beam splitter 111 via the half-wave plate 107 toward the polarization beam splitter 112 in a parallel manner.

The pair of mirrors 14 serves as a reflecting optical system that causes the beam transmitted through the polarization beam splitter 111 to enter the polarization beam splitter 112. Similar to the pair of mirrors 13, the pair of mirrors 14 is constituted of one set consisting of a third fixed mirror (beam-angle setting unit) 14A and a fourth fixed mirror (beam-angle setting unit) 14B that are disposed facing the polarization beam splitters 111 and 112, respectively, and are fixed at predetermined angles.

The third fixed mirror 14A is disposed at a position where it reflects the beam transmitted through the half-wave plate 109 at a right angle toward the fourth fixed mirror 14B. The fourth fixed mirror 14B is disposed at a position where it reflects the incoming beam from the third fixed mirror 14A at a right angle toward the polarization beam splitter 112. Thus, the third fixed mirror 14A and the fourth fixed mirror 14B are capable of deflecting the incoming beam traveling from the polarization beam splitter 111 via the half-wave plate 109 toward the polarization beam splitter 112 in a parallel manner.

With regard to the pair of mirrors 14, the third fixed mirror 14A and the fourth fixed mirror 14B are integrally movable in the incident direction of the laser beam, as well as in a direction that intersects the incident direction. In the pair of mirrors 14, the third fixed mirror 14A and the fourth fixed mirror 14B are positionally adjusted so that the beam is made to enter the polarization beam splitter 112 at a position slightly displaced from the incident position of the beam that enters the polarization beam splitter 112 from the pair of mirrors 13, whereby the optical-path length of the deflected beam is equal to the optical-path length of the beam deflected by the pair of mirrors 13. In FIG. 5, the third fixed mirror 14A and the fourth fixed mirror 14B are disposed at positions displaced by a distance d so as to deflect the beam toward a position displaced by a displacement distance 2d from the incident position of the beam that enters the polarization beam splitter 112 from the pair of mirrors 13.

The polarization beam splitter 112 serves as a merging section where the optical path 101 and the optical path 201 merge. The polarization beam splitter 112 transmits the incoming beam from the pair of mirrors 13 and reflects the incoming beam from the pair of mirrors 14 at a right angle toward the collimating lens 16. Furthermore, the polarization beam splitter 112 causes these beams to travel parallel to each other and to be incident at different locations on the collimating lens 16.

The collimating lens 16 collimates the beams traveling along the optical paths merged by the polarization beam splitter 112 and makes the beams meet at a single point. Thus, the pairs of mirrors 13 and 14, the polarization beam splitter 112, and the collimating lens 16 cause the two optical paths, along which the beams can travel in a switchable manner, to have relative angles in the same plane so that the principal rays of the beams traveling along these optical paths become incident at the same point on the scanner 5.

Next, the operation of the optical scanning device 110 according to this embodiment will be described.

In order to scan a beam at high speed by using the optical scanning device 110 according to this embodiment, a polarization switching unit 105 first switches the polarization direction of a beam emitted from the light source 4 between an s-polarized component and a p-polarized component at high speed.

When the beam is switched to an s-polarized component by the polarization switching unit 105, the beam is reflected by the polarization beam splitter 111 and is changed to a p-polarized component by the half-wave plate 107. Subsequently, the beam is deflected by the pair of mirrors 13 and is then transmitted through the polarization beam splitter 112. On the other hand, when the beam is switched to a p-polarized component by the polarization switching unit 105, the beam is transmitted through the polarization beam splitter 111 and is changed to an s-polarized component by the half-wave plate 109. Subsequently, the beam is deflected by the pair of mirrors 14 and is then reflected by the polarization beam splitter 112 at a position different from the incident position of the beam from the pair of mirrors 13.

The p-polarized beam transmitted through the polarization beam splitter 112 and the s-polarized beam reflected by the polarization beam splitter 112 travel parallel to each other and alternately at certain time intervals in accordance with the polarization-direction switching timing of the polarization switching unit 105. The p-polarized beam and the s-polarized beam are transmitted through different locations on the collimating lens 16 and are given relative angles in the same plane so as to become incident at the same point on the scanner 5.

According to this embodiment, by properly setting the positions of the pair of mirrors 13 and the pair of mirrors 14, the beams traveling along the optical paths 101 and 201 can be made incident at different locations on the reflecting surface of the polarization beam splitter 112 in a state where the optical-path lengths of the optical path 101 and the optical path 201 are equal to each other. In other words, two optical paths that have identical optical-path lengths after passing through the polarization beam splitter 112 and along which the principal rays travel parallel to each other are formed. The beams traveling along these optical paths pass through the collimating lens 16 so as to become collimated beams with identical optical-path lengths and different angles. The collimated beams meet at a single point.

The beams incident on the scanner 5 are scanned in a direction parallel to the aforementioned plane.

In this case, the operation of the control unit 125 causes the scanner 5 to scan the beams in synchronization with the polarization-direction switching timing of the polarization switching unit 105 so that the split beams can be sequentially scanned over the same area at certain time intervals in accordance with their angles of incidence on the scanner 5. Furthermore, by using the polarization beam splitters 111 and 112 to split the beam in accordance with the polarization direction, the intensity of each split beam can be maintained at the same level as the intensity of the beam before it is split.

Consequently, with the optical scanning device 110 according to this embodiment, the polarization direction of a beam is instantaneously and successively switched by the polarization switching unit 105, thereby achieving an improved scanning rate without causing the utilization efficiency of the beam to decrease while radiating the beam uniformly onto an observation surface. Furthermore, since the optical paths of the split beams have the same optical-path length, the positions onto which the beams are focused by an objective lens become the same in the depth direction, which is advantageous in that an imaging plane can be readily formed.

Third Embodiment

Next, an optical scanning device and a scanning inspection apparatus according to a third embodiment of the present invention will be described with reference to FIG. 6.

A scanning inspection apparatus 200 according to this embodiment includes a sample holder 52, such as a slide glass, for holding a sample (subject) 51; a light source 30; an optical scanning device 210; an observation optical system 58 that radiates a beam scanned by the optical scanning device 210 onto the sample 51; a detecting unit 53 that detects light from the sample 51 irradiated with the beam from the observation optical system 58; and a display unit 54 that displays an image of the sample 51 whose light has been detected by the detecting unit 53.

Sections with configurations similar to those in the optical scanning device 100 according to the first embodiment or the optical scanning device 110 according to the second embodiment are given the same reference numerals, and descriptions thereof will be omitted.

The optical scanning device 210 includes an additional set consisting of an optical demultiplexer (multi-beam optical system) 31 that corresponds to the splitting unit (polarization beam splitter 111) and the beam-angle setting units (pairs of mirrors 13 and 14, the polarization beam splitter 112, and the collimating lens 16) described in the second embodiment.

Specifically, the optical scanning device 210 includes a first polarization switching unit 105A that switches the polarization direction of a beam from the light source 30; a first splitting unit 60A that splits the beam whose polarization direction has been switched by the first polarization switching unit 105A; mirrors 63 and 64; a second polarization switching unit 105B that is disposed between the mirrors 63 and 64 and that switches the polarization direction of each of the beams split by the first splitting unit 60A; and a second splitting unit 60B that splits each beam whose polarization direction has been switched by the second polarization switching unit 105B.

The first splitting unit 60A includes a relay lens 32, a polarization beam splitter (splitting unit) 41, pairs of mirrors (beam-angle setting units) 45 and 46, a polarization beam splitter (beam-angle setting unit) 42, a mirror 61, and a relay lens (beam-angle setting unit) 33. The second splitting unit 60B includes a relay lens 34, a polarization beam splitter (splitting unit) 43, a mirror 65, pairs of mirrors (beam-angle setting units) 47 and 48, a polarization beam splitter (beam-angle setting unit) 44, and a relay lens (beam-angle setting unit) 35.

The polarization beam splitters 41 and 42 and the polarization beam splitters 43 and 44 have functions similar to those of the polarization beam splitters 111 and 112 according to the second embodiment, respectively. The pairs of mirrors 45 and 46 and the pairs of mirrors 47 and 48 have functions similar to those of the pairs of mirrors 13 and 14 according to the second embodiment, respectively. The relay lenses 33 and 35 each have a function similar to that of the collimating lens 16 according to the second embodiment.

With regard to the pairs of mirrors 45 and 46 and the pairs of mirrors 47 and 48, the mirrors thereof (i.e., two fixed mirrors (beam-angle setting unit) that constitute each of the pairs of mirrors 45 and 46 and two fixed mirrors (beam-angle setting unit) that constitute each of the pairs of mirrors 47 and 48) are positionally movable (manually or automatically) in the incident direction of a laser beam, as well as in a direction that intersects the incident direction. By changing the positions of the mirrors, the optical-path length of each beam and the distance between principal rays after passing through the polarization beam splitters 42 and 44 can be changed.

Furthermore, the optical scanning device 210 includes a scanner (scanning unit, X galvanometer) 39 that scans each of the beams split by the second splitting unit 60B in an X direction; a relay lens 36 that relays the beams scanned by the scanner 39; a slit 70 that limits an area through which the beams from the relay lens 36 pass; a relay lens 37 that relays the beams that have passed through the slit 70; a scanner (another scanning unit, Y galvanometer) 40 that scans the beams from the relay lens 37 in a Y direction, which is orthogonal to the scanning direction of the scanner 39; a pupil lens 38; and a control unit 55 that controls the switching timings of the polarization switching units 105A and 105B and the scanning timings of the scanners 39 and 40. The scanner 39 has a function similar to that of the scanner 5 according to the second embodiment.

The slit 70 can selectively block part of the beam so that the beam is only radiated onto a predetermined area of a sample. The diameter and the shape of the aperture of the slit 70 are determined based on the area of the sample 51 to be irradiated with the beam.

The scanners 39 and 40 are wide-angle resonant galvanometer drive systems. The control unit 55 controls the scanners 39 and 40 so as to make them scan the split beams over different partial areas of the sample 51.

The control unit 55 has a function similar to that of the control unit 125 according to the second embodiment. Furthermore, the control unit 55 functions as a reconstructing unit that links the light from the sample 51 detected by the detecting unit 53 with the scan positions of the beams so as to reconstruct the light in the form of two-dimensional information or three-dimensional information.

Where necessary, the control unit 55 may include, for example, an input unit (e.g., a keyboard, an input mouse, a touch-screen, etc.) to which a command from a user is input so that the user can perform, for example, desired observation. Moreover, the control unit 55 may cause the display unit 54 to display the reconstructed two-dimensional information or three-dimensional information or to display various kinds of detected numerical data or image data by converting the data into desired display content.

The observation optical system 58 includes a focusing lens 49 that focuses a beam from the pupil lens 38 and an objective lens 50 that radiates the beam focused by the focusing lens 49 onto the sample 51.

Next, the operation of the optical scanning device 210 and the scanning inspection apparatus 200 having the above-described configuration will be described.

In order to observe the sample 51 by using the scanning inspection apparatus 200 according to this embodiment, the first polarization switching unit 105A first switches the polarization direction of a beam emitted from the light source 30 between an s-polarized component and a p-polarized component at high speed.

When the beam is switched to an s-polarized component by the first polarization switching unit 105A, the beam is reflected by the polarization beam splitter 41 via the relay lens 32 and is then deflected by the pair of mirrors 45. Subsequently, the beam is reflected by the polarization beam splitter 42 and then enters the second polarization switching unit 105B via the mirror 61, the relay lens 33, and the mirror 63.

On the other hand, when the beam is switched to a p-polarized component by the first polarization switching unit 105A, the beam is transmitted through the polarization beam splitter 41 via the relay lens 32 and is then deflected by the pair of mirrors 46. Subsequently, the beam is transmitted through the polarization beam splitter 42 and then enters the second polarization switching unit 105B via the mirror 61, the relay lens 33, and the mirror 63.

The polarization direction of the beam entering the second polarization switching unit 105B is switched again between an s-polarized component and a p-polarized component. With regard to the beam entering the second polarization switching unit 105B, a beam output therefrom directly as an s-polarized component or a beam output therefrom after being switched from a p-polarized component to an s-polarized component is reflected by the polarization beam splitter 43 via the mirror 64, the relay lens 34, and the mirror 65, is deflected by the pair of mirrors 48, and is then reflected by the polarization beam splitter 44.

On the other hand, a beam output after being switched from an s-polarized component to a p-polarized component by the second polarization switching unit 105B or a beam output directly as a p-polarized component is transmitted through the polarization beam splitter 43 via the mirror 64, the relay lens 34, and the mirror 65, is deflected by the pair of mirrors 47, and is then transmitted through the polarization beam splitter 44.

In this embodiment, the polarization direction of a beam is switched by the first polarization switching unit 105A and the second polarization switching unit 105B so that a single beam can be split into four optical paths before being output from the second splitting unit 60B.

The beams output from the polarization beam splitter 44 travel parallel to each other and alternately at certain time intervals in accordance with the switching timings of the first polarization switching unit 105A and the second polarization switching unit 105B. The beams are transmitted through different locations on the relay lens 35 and are given relative angles in the same plane so as to become incident at the same location on the scanner 39. The scanner 39 scans these beams in the X direction parallel to the aforementioned plane. After the beams are converged by the relay lens 36, the beams are sequentially made to pass through the slit 70 at certain time intervals.

The beams sequentially passing through the slit 70 at certain time intervals pass through the relay lens 37 and are scanned in the Y direction by the scanner 40. In this case, the beams sequentially scanned over the same area in the X direction at certain time intervals by the scanner 39 are scanned by the scanner 40 at a fixed rate in the Y direction, which is orthogonal to the X direction, so that these beams can be sequentially scanned while being shifted in the Y direction.

The beams scanned by the scanner 40 are focused by the focusing lens 49 via the pupil lens 38 and are radiated onto the sample 51 by the objective lens 50. Thus, the beams are continuously scanned two-dimensionally over the sample 51.

Specifically, in this embodiment, by driving the scanner 39, the split beams are given angles so that they travel selectively toward the aperture, which is at the same location, of the slit 70 in a desired order. By making the beams pass selectively through the slit 70 in the desired order, the beams can be radiated onto the sample 51 at different timings. In addition to making the beams, which have the same optical-path length and are parallel to each other, pass through the slit 70 at different timings, the beams can be radiated uniformly at high speed onto a scan region that corresponds to a partial X-Y focal plane of the split beams relative to a focal plane of the objective lens 50.

By irradiating the sample 51 with the beams, fluorescence, which is signal light, is generated within the sample 51 as an optical response. The fluorescence is transmitted through the sample holder 52 that holds the sample 51, and is detected by the detecting unit 53. When the fluorescence is detected by the detecting unit 53, image information of the sample 51 is reconstructed by the control unit 55 and is displayed on the display unit 54.

In this case, the polarization direction of a beam is instantaneously and successively switched by the polarization switching units 105A and 105B, whereby the beam can be uniformly radiated onto the observation surface, and at the same time, the scanning rate can be improved without causing the utilization efficiency of the beam to decrease. Therefore, with the scanning inspection apparatus 200 according to this embodiment, image information of a wide area of the sample 51 can be acquired and observed with high accuracy within a short period of time.

Fourth Embodiment

An optical scanning device according to a fourth embodiment of the present invention will be described below with reference to the drawings.

Figure 7:
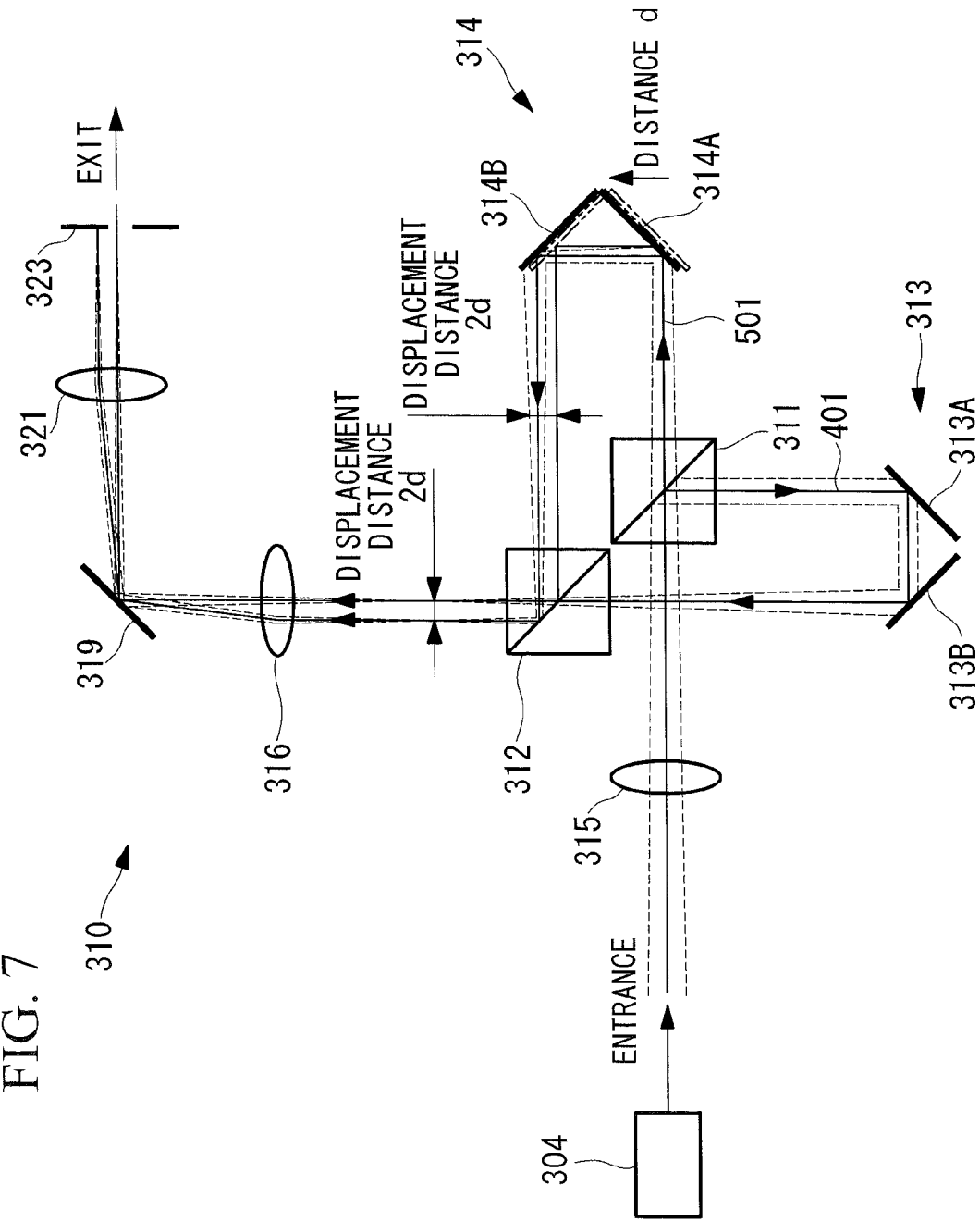
FIG. 7 schematically illustrates the configuration of an optical scanning device according to a fourth embodiment of the present invention.

As shown in FIG. 7, an optical scanning device 310 according to this embodiment includes a beam splitter (splitting unit) 311 that splits a beam (laser beam) emitted from a light source 304 and converged by a converging lens 315 into two optical paths; two pairs of mirrors (beam-angle setting units) 313 and 314 that deflect the split beams; a beam splitter (beam-angle setting unit) 312 that transmits or reflects the deflected laser beams and makes them travel parallel to each other; a collimating lens (beam-angle setting unit) 316 that causes the laser beams traveling parallel to each other to meet at the same location; a scanner (scanning unit) 319, such as a galvanometer mirror, which simultaneously scans the beams meeting at the same location; a converging lens 321 that converges the scanned beams; and a slit 323 that limits an area through which the converged beams pass.

Referring to FIG. 7, with regard to a beam incident on the beam splitter 311, a beam component thereof is reflected by the beam splitter 311 and then enters the beam splitter 312 via the pair of mirrors 313. The optical path of this beam component will be defined as an optical path 401. On the other hand, the other beam component is transmitted through the beam splitter 311 and then enters the beam splitter 312 via the pair of mirrors 314. The optical path of this beam component will be defined as an optical path 501.

The converging lens 315 converges an incident beam, which is a collimated beam.

The beam splitter 311 serves as a splitting unit that splits the beam into the optical path 401 and the optical path 501. The beam splitter 311 reflects a portion of the beam from the converging lens 315 at a right angle toward the pair of mirrors 313, and transmits the other portion of the beam.

The pair of mirrors 313 serves as a reflecting optical system that causes the beam reflected by the beam splitter 311 to enter the beam splitter 312. The pair of mirrors 313 is constituted of one set consisting of a first fixed mirror (beam-angle setting unit) 313A and a second fixed mirror (beam-angle setting unit) 313B. The first fixed mirror 313A and the second fixed mirror 313B are disposed facing the beam splitters 311 and 312, respectively, and are fixed at predetermined angles.

The first fixed mirror 313A is disposed at a position where it reflects the beam reflected by the beam splitter 311 at a right angle toward the second fixed mirror 313B. The second fixed mirror 313B is disposed at a position where it reflects the incoming beam from the first fixed mirror 313A at a right angle toward the beam splitter 312. In other words, the pair of mirrors 313 is capable of deflecting the incoming beam from the beam splitter 311 toward the beam splitter 312 in a parallel manner.

The pair of mirrors 314 serves as a reflecting optical system that causes the beam transmitted through the beam splitter 311 to enter the beam splitter 312. Similar to the pair of mirrors 313, the pair of mirrors 314 is constituted of one set consisting of a third fixed mirror (beam-angle setting unit) 314A and a fourth fixed mirror (beam-angle setting unit) 314B that are disposed facing the beam splitters 311 and 312, respectively, and are fixed at predetermined angles.

The third fixed mirror 314A is disposed at a position where it reflects the beam transmitted through the beam splitter 311 at a right angle toward the fourth fixed mirror 314B. The fourth fixed mirror 314B is disposed at a position where it reflects the incoming beam from the third fixed mirror 314A at a right angle toward the beam splitter 312. Thus, the third fixed mirror 314A and the fourth fixed mirror 314B are capable of deflecting the incoming beam from the beam splitter 311 toward the beam splitter 312 in a parallel manner.

With regard to the pair of mirrors 314, the third fixed mirror 314A and the fourth fixed mirror 314B are integrally movable in the incident direction of the laser beam, as well as in a direction that intersects the incident direction. In the pair of mirrors 314, the third fixed mirror 314A and the fourth fixed mirror 314B are positionally adjusted so that the beam is made to enter the beam splitter 312 at a position slightly displaced from the incident position of the beam that enters the beam splitter 312 from the pair of mirrors 313, whereby the optical-path length of the deflected beam is equal to the optical-path length of the beam deflected by the pair of mirrors 313. In FIG. 7, the third fixed mirror 314A and the fourth fixed mirror 314B are disposed at positions displaced by a distance d so as to deflect the beam toward a position displaced by a displacement distance 2d from the incident position of the beam that enters the beam splitter 312 from the pair of mirrors 313.

The beam splitter 312 serves as a merging section where the optical path 401 and the optical path 501 merge. The beam splitter 312 transmits the incoming beam from the pair of mirrors 313 and reflects the incoming beam from the pair of mirrors 314 at a right angle toward the collimating lens 316. Furthermore, the beam splitter 312 causes these beams to travel parallel to each other and to be incident at different locations on the collimating lens 316.

The collimating lens 316 collimates the beams merged by the beam splitter 312 and makes the beams meet at a single point. Thus, the beam splitter 312 and the collimating lens 316 give the two beams relative angles in the same plane so that the principal rays of these beams become incident at the same point on the scanner 319.

The scanner 319 is configured to oscillate the two incoming beams from the collimating lens 316 in a direction parallel to the aforementioned plane extending along these beams. Thus, the scanner 319 can simultaneously scan the two beams, which are incident on the same location at different angles in the same plane, in a direction parallel to the plane.

Next, the operation of the optical scanning device 310 having the above-described configuration will be described.

In order to scan a beam at high speed by using the optical scanning device 310 according to this embodiment, the beam splitter 311 first splits a beam emitted from the light source 304 and converged by the converging lens 315 into two optical paths.

A beam reflected by the beam splitter 311 is deflected by the first fixed mirror 313A and the second fixed mirror 313B of the pair of mirrors 313 and is then transmitted through the beam splitter 312. On the other hand, a beam transmitted through the beam splitter 311 is deflected by the third fixed mirror 314A and the fourth fixed mirror 314B of the pair of mirrors 314 and is then reflected by the beam splitter 312 at a position different from the incident position of the beam from the pair of mirrors 313.

The beam transmitted through the beam splitter 312 and the beam reflected by the beam splitter 312 travel parallel to each other and become incident at different locations on the collimating lens 316. The collimating lens 316 makes these beams meet at a single point. Thus, the principal rays of these beams are given relative angles in the same plane so as to become incident at the same point on the scanner 319.

According to this embodiment, by properly setting the positions of the pair of mirrors 313 and the pair of mirrors 314, the two beams can be made incident at different locations on the reflecting surface of the beam splitter 312 in a state where the optical-path lengths of the optical path 401 and the optical path 501 are equal to each other. In other words, two beams that have identical optical-path lengths after passing through the beam splitter 312 and whose principal rays are parallel to each other are formed. These beams pass through the collimating lens 316 so as to become two collimated beams with identical optical-path lengths and different angles. The collimated beams meet at a single point.

The beams incident on the scanner 319 are simultaneously scanned in the direction parallel to the aforementioned plane. Thus, the split beams can be sequentially scanned over the same area at certain time intervals in accordance with their angles of incidence on the scanner 319. Consequently, the scanner 319 can make these beams pass successively through the slit 323 at certain intervals via the converging lens 321 so that the beams can be sequentially scanned over a predetermined area of an observation surface.

In this case, the optical-path lengths of the beams scanned by the scanner 319 are made equal to each other by means of the pairs of mirrors 313 and 314 so that the focal positions of the beams on the observation surface can be aligned with each other. Consequently, the optical scanning device 310 according to this embodiment can achieve an improved scanning rate while aligning the focal planes of the beams in a sample.

In this embodiment, the third fixed mirror 314A and the fourth fixed mirror 314B of the pair of mirrors 314 are provided in a movable manner. Alternatively, in at least one of the pair of mirrors 313 and the pair of mirrors 314, the fixed mirrors 313A and 313B or the fixed mirrors 314A and 314B may be integrally movable in the incident direction of the laser beam, as well as in the direction that intersects the incident direction.

Furthermore, in this embodiment, the optical scanning device 310 may include another scanner (another scanning unit, not shown) that scans the beams scanned by the scanner 319 in a direction orthogonal to the scanning direction of the scanner 319.

Accordingly, multiple beams scanned continuously over the same area in one direction by the scanner 319 can be sequentially scanned by the other scanner in the direction orthogonal to this direction, thereby allowing for an improved two-dimensional scanning rate of the beams.

In this embodiment, the beam splitter 311 is described as an example of a splitting unit and the beam splitter 312 is described as an example of a beam-angle setting unit. Alternatively, for example, in the case where the reflecting surface of the beam splitter 311 and the reflecting surface of the beam splitter 312 are disposed in the same plane, as shown in FIG. 7, a single integrated beam splitter that has both a splitting function and a merging function may be used. As another alternative, for example, half mirrors may be used in place of the beam splitters 311 and 312.

Furthermore, in this embodiment, for example, polarization beam splitters may be used in place of the beam splitters 311 and 312. In that case, the light source 304 may emit a circularly-polarized beam or a linearly-polarized beam, and a quarter-wave plate that changes a linearly-polarized beam into a circularly-polarized beam may be disposed in front of a polarization beam splitter disposed at the position of the beam splitter 311. Moreover, a half-wave plate that changes an s-polarized component into a p-polarized component may be disposed between the polarization beam splitter, which is disposed at the position of the beam splitter 311, and the pair of mirrors 313, and a half-wave plate that changes a p-polarized component into an s-polarized component may be disposed between the polarization beam splitter, which is disposed at the position of the beam splitter 311, and the pair of mirrors 314.

Fifth Embodiment

An optical scanning device according to a fifth embodiment of the present invention will be described below with reference to the drawings.

Figure 8:
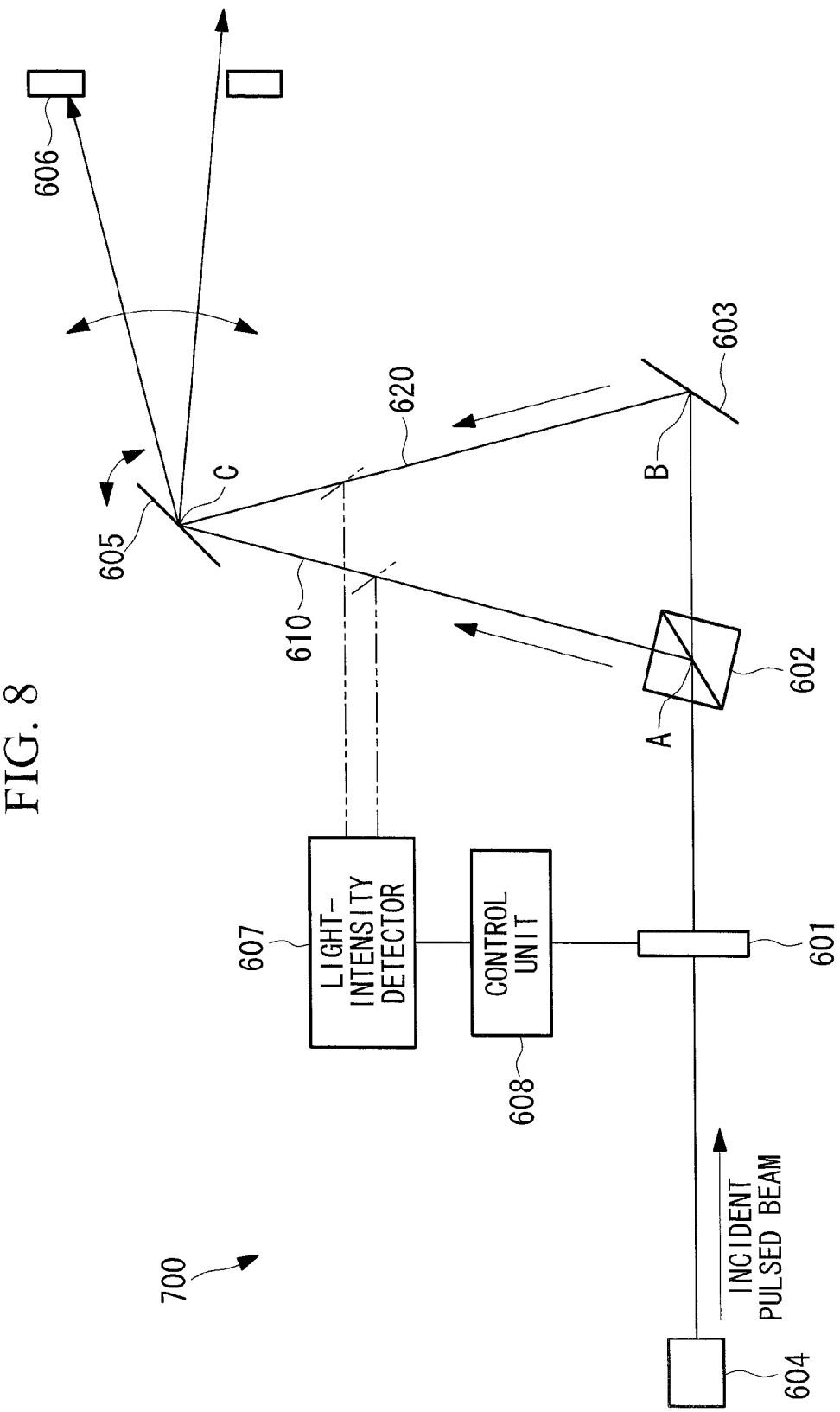
FIG. 8 schematically illustrates the configuration of an optical scanning device according to a fifth embodiment of the present invention.

As shown in FIG. 8, an optical scanning device 700 according to this embodiment includes a half-wave plate (polarization-direction adjusting unit) 601 that transmits a beam (laser beam) emitted from a light source 604 and can adjust the polarization direction of the beam; a polarization beam splitter (splitting unit) 602 that splits the beam whose polarization direction has been adjusted by the half-wave plate 601 into two optical paths; a reflecting optical system (beam-angle setting unit) 603 that reflects one of the beams split by the polarization beam splitter 602; a scanner (scanning unit) 605, such as a galvanometer mirror, which scans the beam reflected by the reflecting optical system 603 and the other beam split by the polarization beam splitter 602; and a slit 606 that limits an area through which the laser beams scanned by the scanner 605 pass.

The optical scanning device 700 further includes a light-intensity detector (light-intensity detecting unit) 607 that detects the intensity of each of the beams split by the polarization beam splitter 602, and a control unit 608 that controls the adjustment of the beam polarization direction performed by the half-wave plate 601 on the basis of the beam intensities detected by the light-intensity detector 607.

In FIG. 8, a point where the principal ray of the beam emitted from the light source 604 intersects with a reflecting surface of the polarization beam splitter 602 will be defined as point A. Furthermore, a point where the principal ray of the beam emitted from the light source 604 intersects with a reflecting surface of the reflecting optical system 603 will be defined as point B. The principal ray of a reflected beam from the polarization beam splitter 602 and the principal ray of a reflected beam from the reflecting optical system 603 intersect at a single point on a reflecting surface of the scanner 605. This intersecting point will be defined as point C.

The light source 604 is configured to emit a linearly-polarized beam.

The half-wave plate 601 is rotatable around an optical axis of the beam and has a main optical axis that is orthogonal to the optical-axis direction of the beam. The half-wave plate 601 can change the angle of polarization of an output beam relative to the main optical axis in accordance with the angle of polarization of an incident beam relative to the main optical axis.

Specifically, when the half-wave plate 601 receives a linearly-polarized beam whose angle of polarization relative to the main optical axis is θ, the half-wave plate 601 rotates the polarization direction by 2θ and outputs the linearly-polarized beam. Furthermore, the half-wave plate 601 can successively change the angle of polarization of an output beam relative to the main optical axis in accordance with the angle of polarization of an incident beam relative to the main optical axis, which is determined based on the rotation angle around the optical axis.

The rotation angle of the half-wave plate 601 around the optical axis is adjusted by the control unit 608.

The polarization beam splitter 602 splits the beam transmitted through the half-wave plate 601 into optical paths of polarized components (i.e., a p-polarized component and an s-polarized component) that are orthogonal to each other. Specifically, the polarization beam splitter 602 reflects the s-polarized component of the incident beam toward the scanner 605 and transmits the p-polarized component of the incident beam. An optical path of the s-polarized beam reflected by the polarization beam splitter 602 will be defined as an optical path 610 (optical path A-C), and an optical path of the p-polarized beam transmitted through the polarization beam splitter 602 will be defined as an optical path 620 (optical path A-B-C).

The reflecting optical system 603 is disposed in the optical path 620 of the p-polarized beam transmitted through the polarization beam splitter 602. The reflecting optical system 603 reflects the incident p-polarized beam toward the scanner 605 along a plane that is shared with the s-polarized beam reflected by the polarization beam splitter 602, and causes the p-polarized beam to enter the scanner 605 at a position that is the same as the incident position of the s-polarized beam. Thus, the beams split into the two optical paths 610 and 620 by the polarization beam splitter 602 are given relative angles in the same plane so as to meet at the same location on the scanner 605.

The scanner 605 rotates parallel to the aforementioned plane that is shared by the incoming s-polarized beam from the polarization beam splitter 602 and the incoming p-polarized beam from the reflecting optical system 603. Thus, the scanner 605 can scan the beams, which are incident on the same location at different angles in the same plane, in a direction parallel to the plane.

The slit 606 is disposed between the scanner 605 and a sample (not shown) and can selectively block part of a beam so that the beam is only radiated onto a predetermined area of the sample. The diameter and the shape of the aperture of the slit 606 are determined based on the area of the sample to be irradiated with the beam.

The light-intensity detector 607 detects the intensity of the beam traveling along the optical path 610 between the polarization beam splitter 602 and the scanner 605, as well as the intensity of the beam traveling along the optical path 620 between the reflecting optical system 603 and the scanner 605. The beam intensities detected by the light-intensity detector 607 are output to the control unit 608.

If the beam intensities detected by the light-intensity detector 607 are substantially equal to each other, the control unit 608 maintains the rotation angle of the half-wave plate 601 around the optical axis. If the beam intensities detected by the light-intensity detector 607 are different from each other, the control unit 608 adjusts the angle of polarization of the beam relative to the main optical axis of the half-wave plate 601 by changing the rotation angle of the half-wave plate 601 around the optical axis so that the polarized components to be obtained by splitting the beam into the two optical paths 610 and 620 by means of the polarization beam splitter 602 have substantially equal intensities.

Next, the operation of the optical scanning device 700 according to this embodiment will be described.

In order to scan a beam emitted from the light source 604 at high speed by using the optical scanning device 700 according to this embodiment, the beam from the light source 604 is first transmitted through the half-wave plate 601 so as to adjust the polarization direction of the beam.

The beam that is transmitted through the half-wave plate 601 and whose polarization direction is adjusted thereby is split by the polarization beam splitter 602 into two optical paths 610 and 620 respectively for an s-polarized component and a p-polarized component that are orthogonal to each other. Specifically, the s-polarized component of the beam is reflected by the polarization beam splitter 602 and travels along the optical path 610 so as to enter the scanner 605. On the other hand, the p-polarized component of the beam is transmitted through the polarization beam splitter 602 and travels along the optical path 620 so as to enter the reflecting optical system 603.

The p-polarized beam incident on the reflecting optical system 603 is given an angle relative to the s-polarized beam in the same plane so as to be made incident on the same location as the s-polarized beam on the scanner 605. Then, these beams are scanned by the scanner 605 in the direction parallel to the aforementioned plane.

Consequently, the split beams are sequentially scanned over the same area at certain time intervals in accordance with their angles of incidence on the scanner 605. Of these two laser beams scanned by the scanner 605, the laser beam scanned within a predetermined area passes through the slit 606, whereas the laser beam scanned outside the predetermined area is blocked by the slit 606. Therefore, a predetermined observation area is continuously scanned by multiple laser beams sequentially passing through the slit 606 at certain time intervals, thereby allowing for an improved scanning rate.

In this case, the light-intensity detector 607 detects the intensity of the beam reflected by the polarization beam splitter 602 and the intensity of the beam transmitted through the polarization beam splitter 602. Based on the detection results, the control unit 608 controls the adjustment of the beam polarization direction performed by the half-wave plate 601 so that the polarized components to be obtained by splitting the laser beam into the two optical paths 610 and 620 by means of the polarization beam splitter 602 have substantially equal intensities.

Specifically, if the beam intensities detected by the light-intensity detector 607 are substantially equal to each other, the control unit 608 maintains the rotation angle of the half-wave plate 601 around the optical axis. On the other hand, if the intensity of the beam reflected by the polarization beam splitter 602 is higher than the intensity of the beam transmitted through the polarization beam splitter 602, the control unit 608 adjusts the rotation angle of the half-wave plate 601 around the optical axis to set the polarization direction such that the proportion of the s-polarized component in the beam to be incident on the polarization beam splitter 602 becomes smaller than the proportion of the p-polarized component. If the intensity of the beam reflected by the polarization beam splitter 602 is lower than the intensity of the beam transmitted through the polarization beam splitter 602, the control unit 608 adjusts the rotation angle of the half-wave plate 601 around the optical axis to set the polarization direction such that the proportion of the s-polarized component in the beam to be incident on the polarization beam splitter 602 is larger than the proportion of the p-polarized component.

Consequently, the beams entering the scanner 605, which are obtained by splitting a beam into two optical paths by means of the polarization beam splitter 602, via the different optical paths 610 and 620 can have substantially equal intensities. Moreover, the same area on a scan surface of a sample can be sequentially scanned by using multiple laser beams with substantially the same brightness.

As described above, with the optical scanning device 700 according to this embodiment, the polarization direction of a laser beam is adjusted by the half-wave plate 601 so that polarized components to be obtained by splitting the laser beam into two optical paths by means of the polarization beam splitter 602 have substantially equal intensities. Thus, the scan surface can be sequentially scanned by using multiple laser beams with substantially the same brightness, regardless of the reflectivity and the transmissivity of the polarization beam splitter 602 and the reflectivity of the reflecting optical system 603. Therefore, with a simple configuration, brightness variations on the scan surface can be prevented, and the scanning rate can be improved. Furthermore, since the light-intensity ratio between the split optical paths can be adjusted relatively freely, strict selection of optical elements is not necessary, which is advantageous in that the manufacturing cost and the troublesome task of alignment can be reduced.

In this embodiment, for example, the optical scanning device 700 may include another scanner (another scanning unit, not shown) that scans the beams scanned by the scanner 605 in a direction orthogonal to the scanning direction of the scanner 605.

Accordingly, the beams scanned continuously over the same area in one direction by the scanner 605 can be sequentially scanned by the other scanner in the direction orthogonal to this direction, thereby allowing for an improved two-dimensional scanning rate of the beams.

The above embodiment can be modified as follows.

Figure 9:
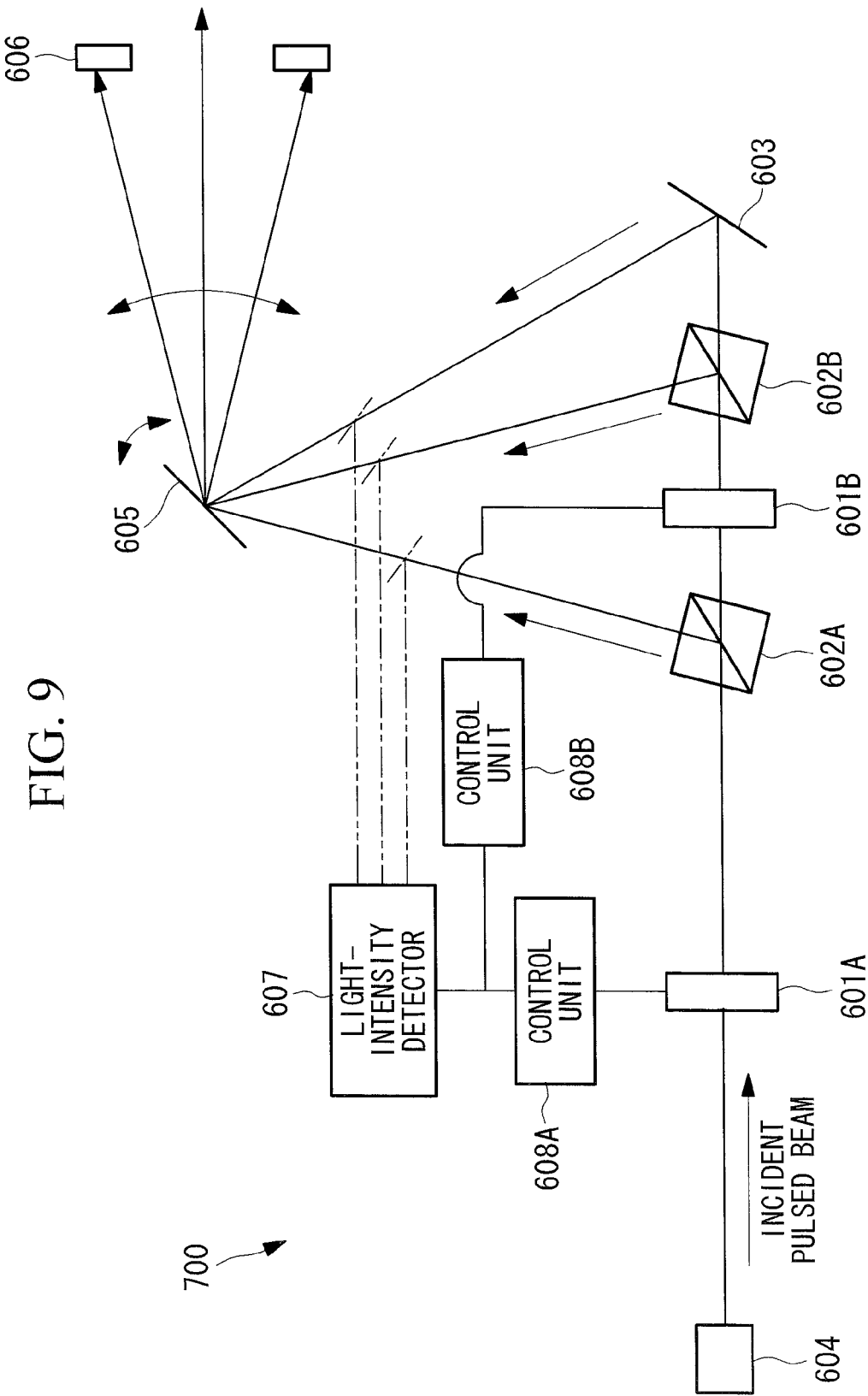
FIG. 9 schematically illustrates the configuration of an optical scanning device according to a modification of the fifth embodiment of the present invention.

In this embodiment, one set consisting of the half-wave plate 601 and the polarization beam splitter 602 is provided as an example. As a modification, multiple sets consisting of half-wave plates 601 and polarization beam splitters 602 may be provided. Accordingly, with the increased combinations of the half-wave plates 601 and the polarization beam splitters 602, the number of beam-splitting locations can be increased. A configuration provided with two sets consisting of half-wave plates 601 and polarization beam splitters 602 will be described below with reference to FIG. 9.

An optical scanning device 700 according to this modification includes a first half-wave plate (polarization-direction adjusting unit) 601A that adjusts the polarization direction of a beam from the light source 604; a first polarization beam splitter (splitting unit) 602A that reflects an s-polarized component of the beam whose polarization direction has been adjusted by the first half-wave plate 601A toward the scanner 605 and transmits a p-polarized component; a second half-wave plate (polarization-direction adjusting unit) 601B that adjusts the polarization direction of the beam transmitted through the first polarization beam splitter 602A; and a second polarization beam splitter (splitting unit) 602B that reflects the s-polarized component of the beam whose polarization direction has been adjusted by the second half-wave plate 601B toward the scanner 605 and transmits the p-polarized component.

In this case, the reflecting optical system 603 may give the beam transmitted through the second polarization beam splitter 602B an angle relative to the beam reflected by the first polarization beam splitter 602A and the beam reflected by the second polarization beam splitter 602B in the same plane and may reflect the transmitted beam toward the scanner 605 so as to make the beams meet at the same location on the scanner 605.

Furthermore, the light-intensity detector 607 may detect the intensity of the beam reflected by the first polarization beam splitter 602A, the intensity of the beam reflected by the second polarization beam splitter 602B, and the intensity of the beam reflected by the reflecting optical system 603. Moreover, a control unit 608A may control the adjustment of the beam polarization direction performed by the first half-wave plate 601A, and a control unit 608B may control the adjustment of the beam polarization direction performed by the second half-wave plate 601B, so that the beam intensities detected by the light-intensity detector 607 become substantially equal to each other.

Accordingly, the beam can be split into three optical paths with equal intensities.

Sixth Embodiment

Next, an optical scanning device according to a sixth embodiment of the present invention will be described with reference to FIG. 10.

An optical scanning device 800 according to this embodiment includes pairs of mirrors (beam-angle setting units) 613 and 614 that deflect beams that have been split into two optical paths by the polarization beam splitter (splitting unit) 602; a polarization beam splitter (beam-angle setting unit) 615 that merges the optical paths of the deflected beams; a collimating lens (beam-angle setting unit) 616; and a converging lens 617 that converges the beams scanned by the scanner 605 and makes the optical axes thereof parallel to each other. Reference numeral 618 denotes a converging lens that changes the beam whose polarization direction has been adjusted by the half-wave plate 601 into a convergent beam.

Sections with configurations similar to those in the optical scanning device 700 according to the fifth embodiment are given the same reference numerals, and descriptions thereof will be omitted.

The polarization beam splitter 602 reflects the s-polarized component of the beam whose polarization direction has been adjusted by the half-wave plate 601 and that is incident on the polarization beam splitter 602 via the converging lens 618 at a right angle toward the pair of mirrors 613 and transmits the p-polarized component of the incident beam.

The pair of mirrors 613 is constituted of one set consisting of a first fixed mirror (beam-angle setting unit) 613A and a second fixed mirror (beam-angle setting unit) 613B. The first fixed mirror 613A and the second fixed mirror 613B are disposed facing the polarization beam splitters 602 and 615, respectively, and are fixed at predetermined angles.

The first fixed mirror 613A is disposed at a position where it reflects the beam coming from the polarization beam splitter 602 at a right angle toward the second fixed mirror 613B. The second fixed mirror 613B is disposed at a position where it reflects the incoming beam from the first fixed mirror 613A at a right angle toward the polarization beam splitter 615. In other words, the pair of mirrors 613 is capable of deflecting the incoming beam from the polarization beam splitter 602 toward the polarization beam splitter 615 in a parallel manner.

Similar to the pair of mirrors 613, the pair of mirrors 614 is constituted of one set consisting of a third fixed mirror (beam-angle setting unit) 614A and a fourth fixed mirror (beam-angle setting unit) 614B that are disposed facing the polarization beam splitters 602 and 615, respectively, and are fixed at predetermined angles.

The third fixed mirror 614A is disposed at a position where it reflects the beam coming from the polarization beam splitter 602 at a right angle toward the fourth fixed mirror 614B. The fourth fixed mirror 614B is disposed at a position where it reflects the incoming beam from the third fixed mirror 614A at a right angle toward the polarization beam splitter 615. In other words, the pair of mirrors 614 is capable of deflecting the incoming beam from the polarization beam splitter 602 toward the polarization beam splitter 615 in a parallel manner.

With regard to the pair of mirrors 614, the third fixed mirror 614A and the fourth fixed mirror 614B are provided in a movable manner. In the pair of mirrors 614, the third fixed mirror 614A and the fourth fixed mirror 614B are positionally adjusted so that the beam is made to enter the polarization beam splitter 615 at a position slightly displaced from the incident position of the beam that enters the polarization beam splitter 615 from the pair of mirrors 613, whereby the optical-path length of the deflected beam is equal to the optical-path length of the beam deflected by the pair of mirrors 613.

Figure 10:
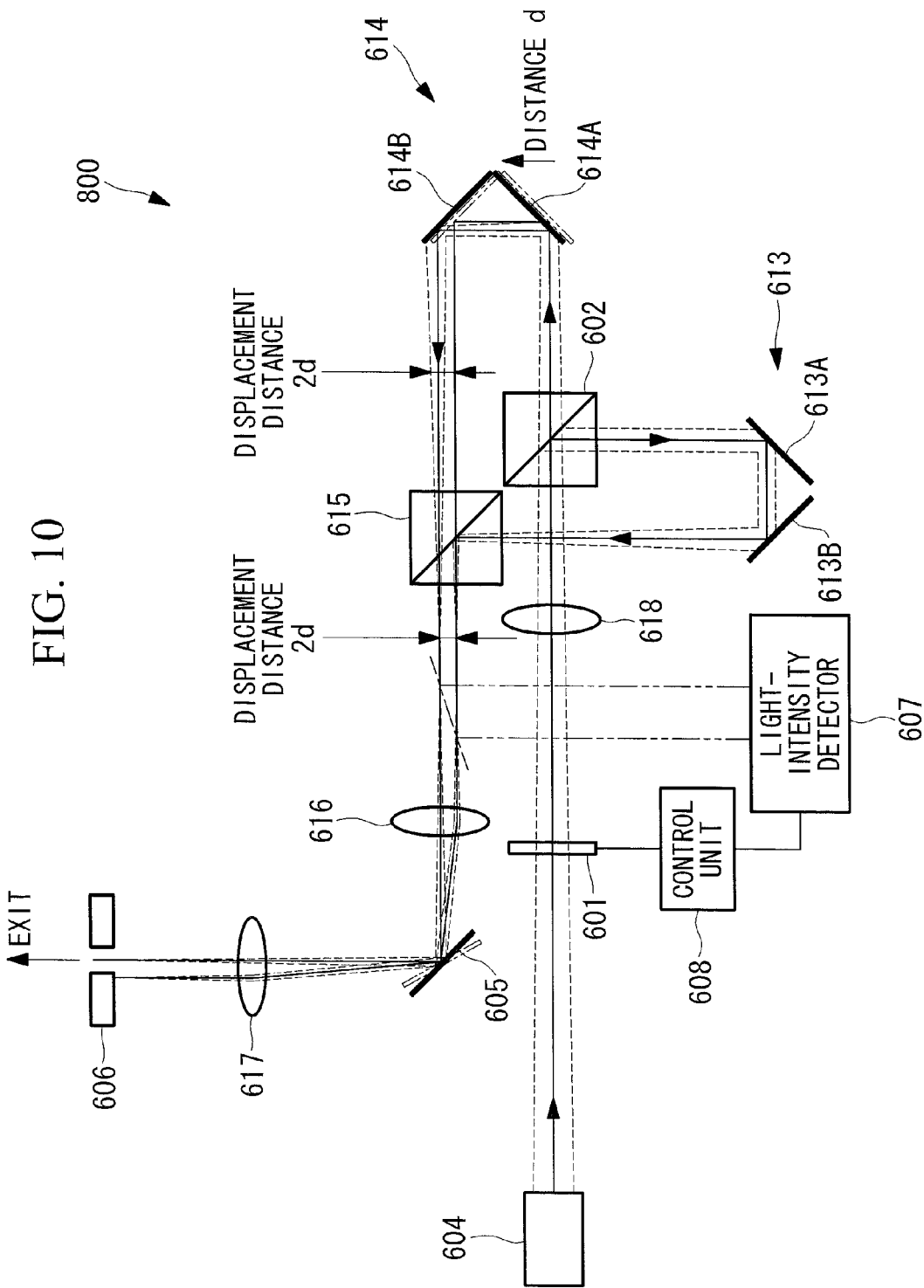
FIG. 10 schematically illustrates the configuration of an optical scanning device according to a sixth embodiment of the present invention.

In FIG. 10, the third fixed mirror 614A and the fourth fixed mirror 614B are disposed at positions displaced by a distance d so as to deflect the beam toward a position displaced by a displacement distance 2d from the incident position of the beam that enters the polarization beam splitter 615 from the pair of mirrors 613.

The polarization beam splitter 615 is capable of merging the beam deflected by the pair of mirrors 613 and the beam deflected by the pair of mirrors 614. The polarization beam splitter 615 reflects the incoming beam from the pair of mirrors 613 at a right angle toward the collimating lens 616 and transmits the incoming beam from the pair of mirrors 614. Furthermore, the polarization beam splitter 615 causes these beams to travel parallel to each other and to be incident at different locations on the collimating lens 616.

The collimating lens 616 collimates the beams from the polarization beam splitter 615 and makes the beams meet at a single point. Thus, the pairs of mirrors 613 and 614, the polarization beam splitter 615, and the collimating lens 616 cause the split beams traveling along the two optical paths to have relative angles in the same plane so that the principal rays of the beams traveling along these optical paths become incident at the same point on the scanner 605.

The light-intensity detector 607 detects the intensities of the beams entering the collimating lens 616 from the polarization beam splitter 615 along the two optical paths and outputs the intensities to the control unit 608.

Next, the operation of the optical scanning device 800 according to this embodiment will be described.

In order to scan a beam emitted from the light source 604 at high speed by using the optical scanning device 800 according to this embodiment, the polarization direction of the beam from the light source 604 is first adjusted by the half-wave plate 601. Then, the beam is changed into a convergent beam by the converging lens 618 before it enters the polarization beam splitter 602.

The s-polarized component of the beam incident on the polarization beam splitter 602 is reflected thereby, is deflected by the pair of mirrors 613, and is then reflected toward the collimating lens 616 by the polarization beam splitter 615. On the other hand, the p-polarized component of the beam incident on the polarization beam splitter 602 is transmitted therethrough, is deflected by the pair of mirrors 614, is transmitted through a position on the polarization beam splitter 615 that is different from the incident position of the beam coming from the pair of mirrors 613, and then enters the collimating lens 616.

In this case, by properly setting the positions of the pair of mirrors 613 and the pair of mirrors 614, the beams can be made incident at different locations on the polarization beam splitter 615 in a state where the optical-path lengths of the s-polarized beam reflected by the polarization beam splitter 602 and the p-polarized beam transmitted through the polarization beam splitter 602 are equal to each other. In other words, two optical paths that have identical optical-path lengths after passing through the polarization beam splitter 615 and along which the principal rays travel parallel to each other are formed.

The beams traveling along these two parallel optical paths pass through the collimating lens 616 so as to become collimated beams with identical optical-path lengths and different angles. The collimated beams meet at a single point so as to become incident at the same location on the scanner 605. The beams incident on the scanner 605 are scanned in a direction parallel to the same plane. Thus, the focal planes of the split beams in a sample can be aligned with each other.

Furthermore, the light-intensity detector 607 detects the intensities of the beams that have been reflected by or transmitted through the polarization beam splitter 615 and travel along the two optical paths. Based on the detection results, the control unit 608 controls the adjustment of the beam polarization direction performed by the half-wave plate 601 so that the polarized components to be obtained by splitting the laser beam into the two optical paths 610 and 620 by means of the polarization beam splitter 602 have substantially equal intensities.

Consequently, the beams entering the scanner 605, which are obtained by splitting a beam into two optical paths by means of the polarization beam splitter 602, via the different optical paths can have substantially equal intensities. Moreover, the same area on a scan surface of a sample can be sequentially scanned by using multiple laser beams with substantially the same brightness.

Accordingly, with the optical scanning device 800 according to this embodiment, the optical-path lengths of the beams to be deflected can be changed by simply changing the positions of the fixed mirrors 614A and 614B, whereby the optical-path lengths of two beams to be scanned by the scanner 605 can be readily made equal to each other. Therefore, while the optical-path lengths of the split beams are made equal to each other, brightness variations on the scan surface can be prevented, and the scanning rate can be improved. Consequently, the positions onto which the beams are focused by an objective lens become the same in the depth direction, whereby an imaging plane can be readily formed.

In this embodiment, the third fixed mirror 614A and the fourth fixed mirror 614B of the pair of mirrors 614 are integrally movable in the incident direction of the laser beam, as well as in a direction that intersects the incident direction. Alternatively, the first fixed mirror 613A and the second fixed mirror 613B of the pair of mirrors 613 may be integrally movable in the incident direction of the laser beam, as well as in the direction that intersects the incident direction.

Seventh Embodiment

Figure 11:
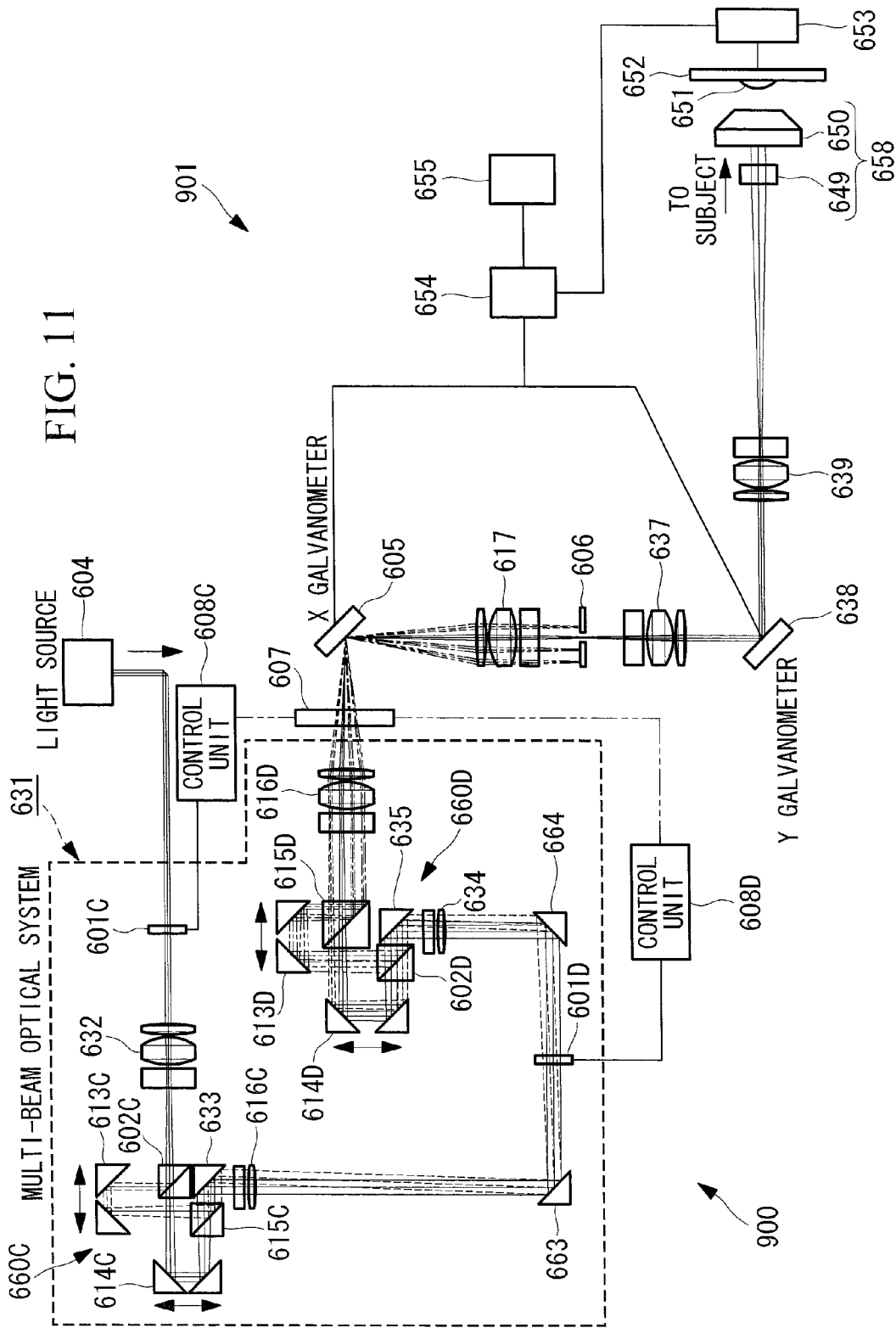
FIG. 11 schematically illustrates the configuration of an optical scanning device according to a seventh embodiment of the present invention.

Next, an optical scanning device and a scanning inspection apparatus according to a seventh embodiment of the present invention will be described with reference to FIG. 11.

A scanning inspection apparatus 901 according to this embodiment includes a sample holder 652, such as a slide glass, for holding a sample (subject) 651; a light source 604; an optical scanning device 900; an observation optical system 658 that radiates beams scanned by the optical scanning device 900 onto the sample 651; a detecting unit 653 that detects light from the sample 651 irradiated with the beams from the observation optical system 658; a reconstructing unit 654 that reconstructs light information from the sample 651 detected by the detecting unit 653 in the form of two-dimensional information or three-dimensional information; and a display unit 655 that displays image information of the sample 651 reconstructed by the reconstructing unit 654.

Sections with configurations similar to those in the optical scanning device 700 according to the fifth embodiment or the optical scanning device 800 according to the sixth embodiment are given the same reference numerals, and descriptions thereof will be omitted.

The optical scanning device 900 includes an additional set consisting of an optical demultiplexer (multi-beam optical system) 631 that corresponds to the half-wave plate 601, the splitting unit (polarization beam splitter 602), and the beam-angle setting units (the pairs of mirrors 613 and 614, the polarization beam splitter 615, and the collimating lens 616) described in the sixth embodiment, and is capable of splitting a beam emitted from the light source 604 into four optical paths.

Specifically, the optical scanning device 900 includes a first half-wave plate 601C that adjusts the polarization direction of the beam from the light source 604; a first splitting unit 660C that splits the beam whose polarization direction has been switched by the first half-wave plate 601C; mirrors 663 and 664; a second half-wave plate 601D that is disposed between the mirrors 663 and 664 and adjusts the polarization direction of each of the beams split by the first splitting unit 660C; and a second splitting unit 660D that splits each beam whose polarization direction has been adjusted by the second half-wave plate 601D into two optical paths.

The first splitting unit 660C includes a relay lens 632, a polarization beam splitter (splitting unit) 602C, pairs of mirrors (beam-angle setting units) 613C and 614C, a polarization beam splitter (beam-angle setting unit) 615C, a mirror 633, and a relay lens (beam-angle setting unit) 616C.

The second splitting unit 660D includes a relay lens 634, a mirror 635, a polarization beam splitter (splitting unit) 602D, pairs of mirrors (beam-angle setting units) 613D and 614D, a polarization beam splitter (beam-angle setting unit) 615D, and a relay lens (beam-angle setting unit) 616D.

The polarization beam splitters 602C and 602D and the polarization beam splitters 615C and 615D have functions similar to those of the polarization beam splitter 602 and the polarization beam splitter 615 according to the sixth embodiment, respectively. The pairs of mirrors 613C and 614C and the pairs of mirrors 613D and 614D have functions similar to those of the pair of mirrors 613 and the pair of mirrors 614 according to the sixth embodiment, respectively. The relay lenses 616C and 616D each have a function similar to that of the collimating lens 616 according to the sixth embodiment.

With regard to the pairs of mirrors 613C and 614C and the pairs of mirrors 613D and 614D, the mirrors thereof (i.e., two fixed mirrors (beam-angle setting unit) 613A and 613B that constitute each of the pairs of mirrors 613C and 614C and two fixed mirrors (beam-angle setting unit) 613A and 613B that constitute each of the pairs of mirrors 613D and 614D) are positionally movable (manually or automatically) in the incident direction of a laser beam, as well as in a direction that intersects the incident direction. By changing the positions of the mirrors, the optical-path length of each beam and the distance between principal rays after passing through the polarization beam splitters 615C and 615D can be changed.

Furthermore, the optical scanning device 900 includes a scanner (scanning unit, X galvanometer) 605 that scans each of the beams split by the second splitting unit 660D in the X direction; a converging lens 617 that converges the beams scanned by the scanner 605 and makes the optical axes thereof parallel to each other; a slit 606 that limits an area through which the beams from the converging lens 617 pass; a relay lens 637 that relays the beams that have passed through the slit 606; a scanner (another scanning unit, Y galvanometer) 638 that scans the beams from the relay lens 637 in the Y direction, which is orthogonal to the scanning direction of the scanner 605; and a pupil lens 639.

The four beams split by the first splitting unit 660C and the second splitting unit 660D are scanned over different partial areas of the sample 651 by the scanners 605 and 638.

The reconstructing unit 654 links the light from the sample 651 detected by the detecting unit 653 with the scan positions of the beams so as to reconstruct the light in the form of two-dimensional information or three-dimensional information. Where necessary, the reconstructing unit 654 may include, for example, an input unit (e.g., a keyboard, an input mouse, a touch-screen, etc.) to which a command from a user is input so that the user can perform, for example, desired observation. Moreover, the reconstructing unit 654 may cause the display unit 655 to display the reconstructed two-dimensional information or three-dimensional information or to display various kinds of detected numerical data or image data by converting the data into desired display content.

The observation optical system 658 includes a focusing lens 649 that focuses a beam from the pupil lens 639 and an objective lens 650 that radiates the beam focused by the focusing lens 649 onto the sample 651.

In the optical scanning device 900, the light-intensity detector 607 detects the intensities of the beams traveling along the four optical paths between the relay lens 616D and the scanner 605, and the control unit 608 controls the adjustment of the beam polarization direction performed by the first half-wave plate 601C and the second half-wave plate 601D.

Next, the operation of the optical scanning device 900 and the scanning inspection apparatus 901 having the above-described configuration will be described.

In order to observe the sample 651 by using the scanning inspection apparatus 901 according to this embodiment, a beam is first generated from the light source 604. The first half-wave plate 601C then adjusts the polarization direction of the beam, and the beam is made to enter the polarization beam splitter 602C via the relay lens 632.

The s-polarized component of the beam incident on the polarization beam splitter 602C is reflected by the polarization beam splitter 602C and is then deflected by the pair of mirrors 613C. Subsequently, the s-polarized component of the beam is reflected by the polarization beam splitter 615C and becomes incident on the second half-wave plate 601D via the mirror 633, the relay lens 616C, and the mirror 663.

On the other hand, the p-polarized component of the beam incident on the polarization beam splitter 602C is transmitted therethrough and is deflected by the pair of mirrors 614C. Subsequently, the p-polarized component of the beam is transmitted through the polarization beam splitter 615C and becomes incident on the second half-wave plate 601D via the mirror 633, the relay lens 616C, and the mirror 663.

The polarization direction of each of the beams traveling along the two optical paths and incident on the second half-wave plate 601D is adjusted by the second half-wave plate 601D. Then, the beams enter the polarization beam splitter 602D via the mirror 664, the relay lens 634, and the mirror 635.

The s-polarized component of each beam incident on the polarization beam splitter 602D is reflected thereby, is deflected by the pair of mirrors 613D, and is then reflected by the polarization beam splitter 615D.

On the other hand, the p-polarized component of each beam incident on the polarization beam splitter 602D is transmitted therethrough, is deflected by the pair of mirrors 614D, and is then transmitted through the polarization beam splitter 615D.

In this embodiment, the polarization beam splitter 602C splits a beam into two optical paths along which the respective polarized components that are orthogonal to each other travel, and the polarization beam splitter 602D splits each of the polarized beams, which are orthogonal to each other and travel along the two optical paths, into two optical paths, whereby beams split into four optical paths can be output from the polarization beam splitter 615D.

The beams traveling along the four optical paths and output from the polarization beam splitter 615D are transmitted through different locations on the relay lens 616D and are given relative angles in the same plane so that the beams become incident at the same location on the scanner 605. The scanner 605 scans these beams in the X direction parallel to the aforementioned plane, and the converging lens 617 makes their optical axes parallel to each other. Subsequently, the beams are made to sequentially pass through the slit 606 at certain time intervals.

The beams passing through the slit 606 pass through the relay lens 637 and are scanned in the Y direction by the scanner 638. In this case, the beams sequentially scanned over the same area in the X direction at certain time intervals by the scanner 605 are scanned by the scanner 638 at a fixed rate in the Y direction, which is orthogonal to the X direction, so that these beams can be sequentially scanned while being shifted in the Y direction.

The beams scanned by the scanner 638 are focused by the focusing lens 649 via the pupil lens 639 and are radiated onto the sample 651 by the objective lens 650. Thus, the beams are continuously scanned two-dimensionally over the sample 651.

Specifically, in this embodiment, by driving the scanner 605, the split beams are given angles so that they travel selectively toward the aperture, which is at the same location, of the slit 606 in a desired order. By making the beams pass selectively through the slit 606 in the desired order, the beams can be radiated onto the sample 651 at different timings. In addition to making the beams, which have the same optical-path length and are parallel to each other, pass through the slit 606 at different timings, the beams can be radiated uniformly at high speed onto a scan region that corresponds to a partial X-Y focal plane of the split beams relative to the focal plane of the objective lens 650.

By irradiating the sample 651 with the beams, fluorescence, which is signal light, is generated within the sample 651 as an optical response. The fluorescence is transmitted through the sample holder 652 that holds the sample 651, and is detected by the detecting unit 653. When the fluorescence is detected by the detecting unit 653, image information of the sample 651 is reconstructed by the reconstructing unit 654 and is displayed on the display unit 655.

In this case, the polarization direction of the beams is adjusted by the half-wave plates 601C and 601D on the basis of the beam intensities detected by the light-intensity detector 607 so that the polarized components split by the polarization beam splitters 602C and 602D have substantially equal intensities. Thus, a scan surface can be scanned with multiple beams having substantially the same brightness relative to the observation surface, and at the same time, the scanning rate can be improved. Consequently, with the scanning inspection apparatus 901 according to this embodiment, image information of a wide area of the sample 651 with no brightness variations can be acquired and observed with high accuracy within a short period of time.

Eighth Embodiment

Next, an optical scanning device and a scanning inspection apparatus according to an eighth embodiment of the present invention will be described.

Figure 12:
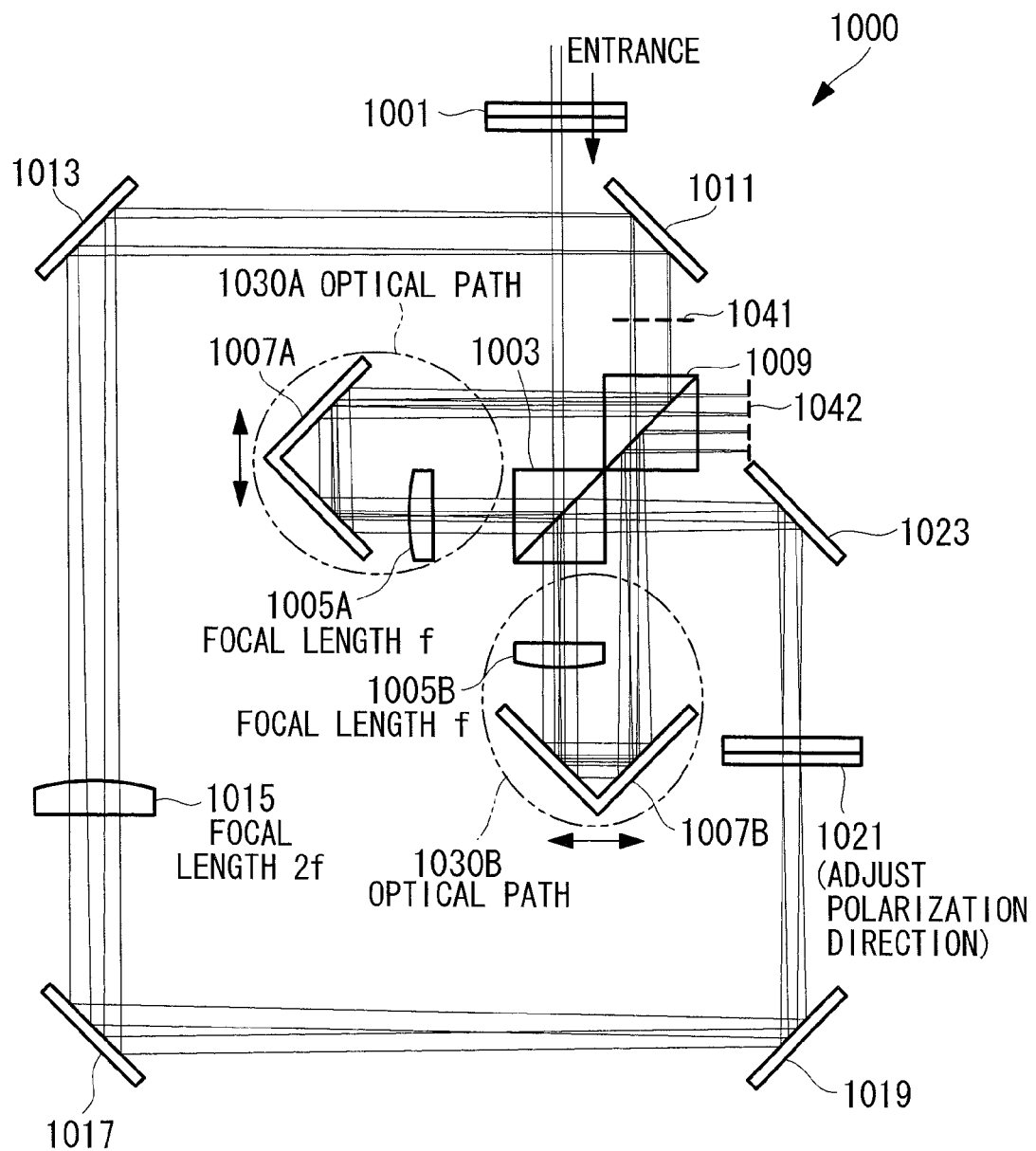
FIG. 12 schematically illustrates the configuration of an optical scanning device according to an eighth embodiment of the present invention.

As shown in FIG. 12, an optical scanning device 1000 according to this embodiment includes a first polarization adjusting element (polarization adjusting unit) 1001 that adjusts the polarization direction of a beam (laser beam) emitted from a light source (not shown); a first polarization beam splitter (splitting unit) 1003 that splits the beam whose polarization direction has been adjusted by the first polarization adjusting element 1001 into two optical paths in accordance with the polarization direction; first converging lenses 1005A and 1005B that converge each of the split beams; movable mirrors (beam-angle setting units) 1007A and 1007B that deflect the converged beams; and a second polarization beam splitter (beam-angle setting unit) 1009 that merges the optical paths of the deflected beams.

Sections with configurations similar to those in the optical scanning device 700 according to the fifth embodiment or the optical scanning device 900 and the scanning inspection apparatus 901 according to the seventh embodiment are given the same reference numerals, and descriptions thereof will be omitted.

The light source has, for example, a configuration similar to that of the light source 304 described above and is configured to emit a linearly-polarized beam.

The first polarization adjusting element 1001 is configured to adjust the polarization components of the beam to be incident on the first polarization beam splitter 1003 so that the beam is split by the first polarization beam splitter 1003 into two optical paths with an intensity ratio of 1:1.

Specifically, in this embodiment, for example, a quarter-wave plate is used as the first polarization adjusting element 1001 and is configured to change the linearly-polarized beam emitted from the light source into a circularly-polarized beam containing an s-polarized component and a p-polarized component.

The first polarization beam splitter 1003 has a configuration similar to that of the polarization beam splitter 111. The first polarization beam splitter 1003 reflects the s-polarized component of the incident circularly-polarized beam at a right angle and transmits the p-polarized component.

The first converging lenses 1005A and 1005B each have a focal length f.

The movable mirrors 1007A and 1007B each have a configuration similar to that of each of the pairs of mirrors 13 and 14. Each of the movable mirrors 1007A and 1007B deflects the s-polarized beam or the p-polarized beam received from the first polarization beam splitter 1003 in a parallel manner and makes the s-polarized beam or the p-polarized beam enter the second polarization beam splitter 1009.

With regard to each of the movable mirrors 1007A and 1007B, the positions of the mirrors thereof (i.e., the positions of two fixed mirrors (beam-angle setting unit) that constitute each of the movable mirrors 1007A and 1007B) can be moved as a single unit, manually or automatically, in the incident direction of a beam, as well as in a direction that intersects the incident direction. By changing the mirror positions, the movable mirrors 1007A and 1007B can change the optical-path lengths of the beams and the distance between principal rays thereof in the second polarization beam splitter 1009.

In FIG. 12, with regard to the linearly-polarized beam split by the first polarization beam splitter 1003, a beam component thereof enters the second polarization beam splitter 1009 via the movable mirror 1007A. The optical path of this beam component will be defined as an optical path 1030A. On the other hand, the other beam component enters the second polarization beam splitter 1009 via the movable mirror 1007B. The optical path of this beam component will be defined as an optical path 1030B.

The second polarization beam splitter 1009 has a configuration similar to that of the polarization beam splitter 112. The beam traveling along the optical path 1030A and the beam traveling along the optical path 1030B enter the second polarization beam splitter 1009 at different locations thereof from different directions. The second polarization beam splitter 1009 reflects the s-polarized beam at a right angle and transmits the p-polarized beam.

Thus, the two beams entering the second polarization beam splitter 1009 from different directions are output therefrom as beams with parallel principal rays traveling in the same direction. The beams form focal points at different locations on a first imaging plane 1041 or a second imaging plane 1042 located at a position corresponding to the focal length f from the first converging lens 1005A or 1005B.

The optical scanning device 1000 further includes a mirror (re-entry mirror) 1011 and a mirror (re-entry mirror) 1013 that reflect the beams output from the second polarization beam splitter 1009; a second converging lens 1015 that converges the beams reflected by the mirror 1011 and the mirror 1013; a mirror (re-entry mirror) 1017 and a mirror (re-entry mirror) 1019 that reflect the converged beams; a second polarization adjusting element (polarization adjusting unit) 1021 that adjusts the polarization direction of the beams reflected by the mirror 1019; and a mirror 1023 that reflects the beams whose polarization direction has been adjusted by the second polarization adjusting element 1021 so as to make the beams enter the first polarization beam splitter 1003 again.

The second converging lens 1015 has a focal length 2f.

The second polarization adjusting element 1021 has a configuration similar to that of the first polarization adjusting element 1001 and is configured to adjust the polarized components of each beam which is to re-enter the first polarization beam splitter 1003, so that each beam is split by the first polarization beam splitter 1003 into two optical paths with an intensity ratio of 1:1.

Specifically, a quarter-wave plate is used as the second polarization adjusting element 1021 and is configured to change a linearly-polarized beam into a circularly-polarized beam containing an s-polarized component and a p-polarized component. Furthermore, the second polarization adjusting element 1021 is configured to make a beam enter the first polarization beam splitter 1003 from a direction different from that of the beam coming from the first polarization adjusting element 1001.

Thus, the two beams entering the first polarization beam splitter 1003 from the second polarization adjusting element 1021 are each split into two optical paths for an s-polarized beam and a p-polarized beam, respectively, so that a total of four beams are output from the first polarization beam splitter 1003.

The four beams output from the first polarization beam splitter 1003 are made to enter the second polarization beam splitter 1009 again via the optical path 1030A or the optical path 1030B. With regard to each of the four beams re-entering the second polarization beam splitter 1009, the s-polarized component is reflected therein at a right angle and the p-polarized component is transmitted therethrough, so that the s-polarized component and the p-polarized component are output therefrom as beams with parallel principal rays traveling in the same direction. Thus, the four beams form focal points at different locations on the second imaging plane 1042.

The optical scanning device 1000 further includes a collimating lens (beam-angle setting unit) (not shown) that causes the four beams forming the focal points at different locations on the second imaging plane 1042 to meet at the same location, and a scanner (scanning unit) (not shown), such as a galvanometer mirror, which scans the beams that have been made to meet at the same location by the collimating lens.

The collimating lens and the scanner have configurations similar to those of the collimating lens 16 and the scanner 5, respectively. Therefore, the movable mirrors 1007A and 1007B, the second polarization beam splitter 1009, and the collimating lens give the four optical paths, into which a beam is split, relative angles in the same plane so that the principal rays of the split beams become incident at the same point on the scanner.

Furthermore, the scanner rotates around a rotation axis that is orthogonal to a plane extending parallel to the four beams. Thus, the scanner scans the beams, which are incident at the same location on the scanner at different angles, in a direction parallel to the aforementioned plane.

Since the configurations of sections subsequent to the scanner, such as the converging lens 617, the slit 606, the relay lens 637, the scanner (another scanning unit, Y galvanometer) 638, and the pupil lens 639, and the configurations of sections included in the scanning inspection apparatus 901, such as the sample holder 652, the observation optical system 658, the detecting unit 653, the reconstructing unit 654, and the display unit 655, are similar to those in the seventh embodiment, descriptions thereof will be omitted.

The operation of the optical scanning device 1000 according to this embodiment having the above-described configuration will now be described.

In order to scan a beam at high speed by using the optical scanning device 1000 according to this embodiment, a linearly-polarized beam emitted from the light source is first made to enter the first polarization adjusting element 1001.

The beam entering the first polarization adjusting element 1001 is changed into a circularly-polarized beam containing an s-polarized component and a p-polarized component so that the beam can be split by the first polarization beam splitter 1003 into two optical paths with an intensity ratio of 1:1, and is output from the first polarization adjusting element 1001. The beam output from the first polarization adjusting element 1001 then enters the first polarization beam splitter 1003.

Figure 13:
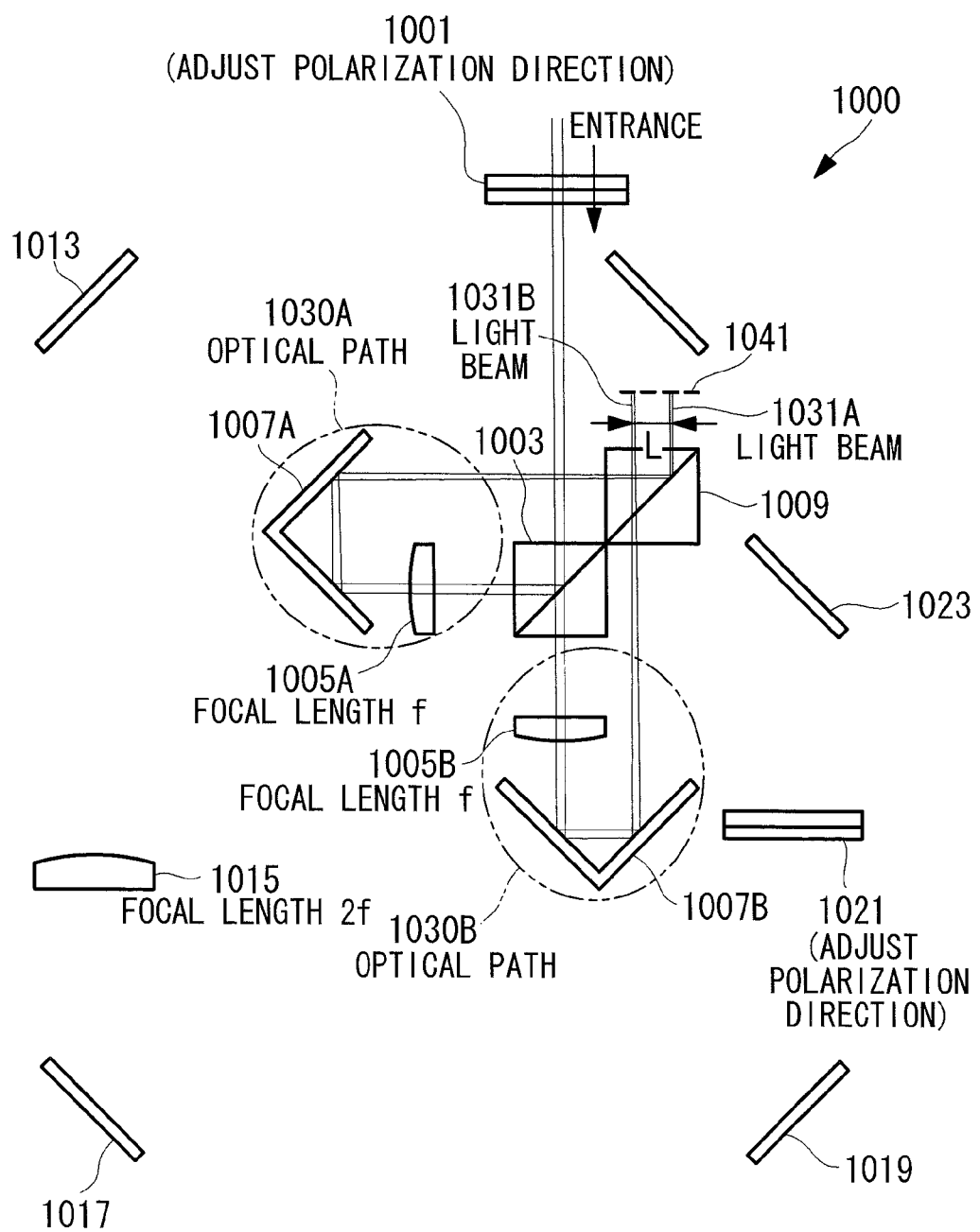
FIG. 13 illustrates light beams on a first pass, which are obtained as a result of splitting a beam in the optical scanning device in FIG. 12.

As shown in FIG. 13, with regard to the beam entering the first polarization beam splitter 1003, the s-polarized component is reflected therein and travels along the optical path 1030A, whereas the p-polarized component is transmitted therethrough and travels along the optical path 1030B. Consequently, one light beam is split into two light beams at the first polarization beam splitter 1003.

Subsequently, the s-polarized beam traveling along the optical path 1030A is converged by the first converging lens 1005A, is deflected by the movable mirror 1007A, and is then reflected by the second polarization beam splitter 1009. On the other hand, the p-polarized beam traveling along the optical path 1030B is converged by the first converging lens 1005B, is deflected by the movable mirror 1007B, and is then transmitted through a position on the second polarization beam splitter 1009 that is different from the incident position of the beam from the optical path 1030A. In FIG. 13, a light beam traveling along the optical path 1030A on a first pass (i.e., for the first time) will be defined as a light beam 1031A, and a light beam traveling along the optical path 1030B on the first pass will be defined as a light beam 1031B.

The movable mirrors 1007A and 1007B are positionally adjusted so as to obtain two light beams, that is, the light beam 1031A reflected by the second polarization beam splitter 1009 and the light beam 1031B transmitted through the second polarization beam splitter 1009, whose principal rays are parallel to each other and are separated by a distance L. Each of the beams is focused onto the first imaging plane 1041.

In this case, at least one of the movable mirrors 1007A and 1007B is moved in a direction that is orthogonal to an optical axis of an incident beam or a reflected beam so that the distance between the principal rays can be changed without changing the optical-path length from each of the first converging lenses 1005A and 1005B to the first imaging plane 1041. The movable mirror 1007A or 1007B is moved within a range in which the light beams do not deviate from the second polarization beam splitter 1009.

Figure 14:
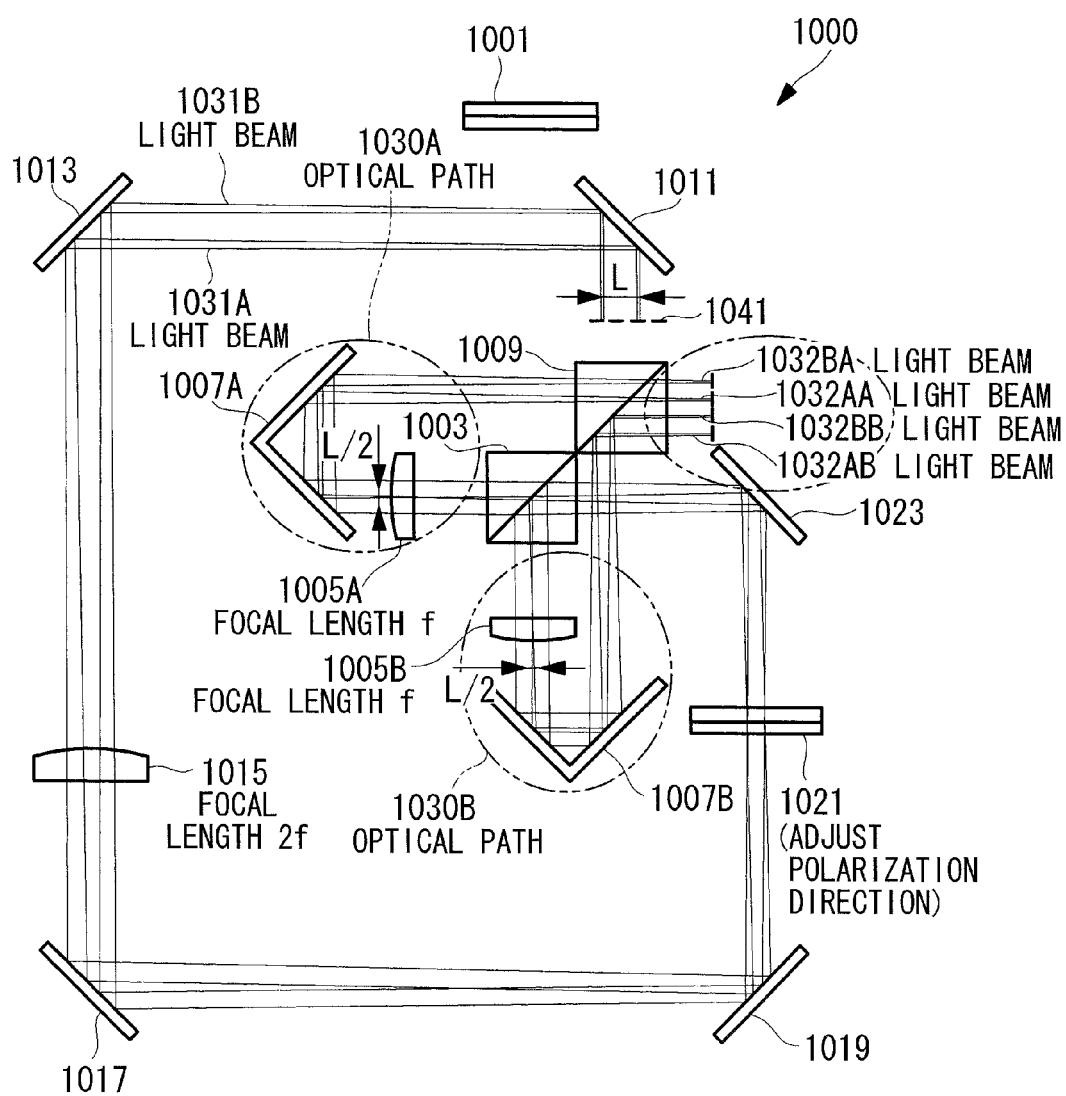
FIG. 14 illustrates light beams on a second pass, which are obtained as a result of splitting the beam in the optical scanning device in FIG. 12.

As shown in FIG. 14, the light beams 1031A and 1031B focused on the first imaging plane 1041 enter the second converging lens 1015 via the mirror 1011 and the mirror 1013. The beams are collimated by the second converging lens 1015 and then enter the second polarization adjusting element 1021 via the mirror 1017 and the mirror 1019.

Each of the linearly-polarized beams entering the second polarization adjusting element 1021 is changed into a circularly-polarized beam containing an s-polarized component and a p-polarized component so that each beam can be split by the first polarization beam splitter 1003 into two optical paths with an intensity ratio of 1:1, and is output from the second polarization adjusting element 1021. The beams output from the second polarization adjusting element 1021 are reflected by the mirror 1023 and are made to enter the first polarization beam splitter 1003 again from a direction different from the direction in which the beam enters the first polarization beam splitter 1003 from the first polarization adjusting element 1001.

With regard to each of the beams re-entering the first polarization beam splitter 1003, the p-polarized component is transmitted therethrough so as to travel along the optical path 1030A, whereas the s-polarized component is reflected therein so as to travel along the optical path 1030B. Thus, two light beams are split into four light beams at the first polarization beam splitter 1003.

The p-polarized beams traveling along the optical path 1030A are deflected by the movable mirror 1007A and are then transmitted through the second polarization beam splitter 1009. On the other hand, the s-polarized beams traveling along the optical path 1030B are deflected by the movable mirror 1007B and are then reflected by the second polarization beam splitter 1009 at a position different from the incident position of the beams from the optical path 1030A. Thus, four light beams are output from the second polarization beam splitter 1009 as collimated beams and are focused onto the second imaging plane 1042.

In the first polarization beam splitter 1003, a beam that is reflected on the first pass and is transmitted on the second pass, that is, a light beam that travels along the optical path 1030A on both the first and second passes, will be defined as a first light beam 1032AA, whereas a beam that is transmitted on the first pass and is transmitted on the second pass, that is, a light beam that travels along the optical path 1030B on the first pass and along the optical path 1030A on the second pass, will be defined as a second light beam 1032BA.

Furthermore, in the first polarization beam splitter 1003, a beam that is reflected on the first pass and is reflected on the second pass, that is, a light beam that travels along the optical path 1030A on the first pass and along the optical path 1030B on the second pass, will be defined as a third light beam 1032AB, whereas a beam that is transmitted on the first pass and is reflected on the second pass, that is, a light beam that travels along the optical path 1030B on both the first and second passes, will be defined as a fourth light beam 1032BB.

Although the principal rays of the first light beam 1032AA and the second light beam 1032BA are separated from each other by a distance L at the first imaging plane 1041, since the focal length f of the first converging lens 1005B is ½ the focal length 2f of the second converging lens 1015, the distance between the principal rays is reduced by ½ by the first converging lens 1005A.

Likewise, although the principal rays of the third light beam 1032AB and the fourth light beam 1032BB are separated from each other by a distance L at the first imaging plane 1041, since the focal length f of the first converging lens 1005B is ½ the focal length 2f of the second converging lens 1015, the distance between the principal rays is reduced by ½ by the first converging lens 1005B.

In this case, the movable mirrors 1007A and 1007B are disposed such that the distance between the principal rays is equal to L at the first imaging plane 1041, whereby an intermediate point between the principal rays of the first light beam 1032AA and the second light beam 1032BA and an intermediate point between the principal rays of the third light beam 1032AB and the fourth light beam 1032BB are separated from each other by a distance L at the second imaging plane 1042 where the four light beams 1032AA, 1032BA, 1032AB, and 1032BB merge. In other words, the four light beams 1032BA, 1032AA, 1032BB, and 1032AB are separated from one another by a distance L/2.

Subsequently, the four light beams 1032BA, 1032AA, 1032BB, and 1032AB focused on the second imaging plane 1042 are transmitted through different locations on the collimating lens and are given relative angles in the same plane. The light beams then become incident at the same location on the scanner and are scanned in a direction parallel to the aforementioned plane. Consequently, the four split light beams can be sequentially scanned over the same area at certain time intervals in accordance with their angles of incidence on the scanner.

In this case, by simply moving at least one of the movable mirrors 1007A and 1007B, the distances among the four light beams 1032BA, 1032AA, 1032BB, and 1032AB can be changed while keeping them evenly spaced apart from one another without changing the optical-path length from each of the first converging lenses 1005A and 1005B to the first imaging plane 1041.

As described above, with the optical scanning device 1000 according to this embodiment, a beam whose polarized components have been adjusted is made to pass twice through the first polarization beam splitter 1003 and the second polarization beam splitter 1009, which are of the same kind, from different directions so that a single light beam is split into four light beams, thereby achieving an increased scanning rate, as well as achieving a reduced size, a reduced number of components, and lower cost.

Furthermore, the distance between the four light beams can be changed (i.e., zooming can be performed) by simply moving at least one of the movable mirrors 1007A and 1007B so that only a single adjustment location is necessary, thereby allowing for a simplified operation.

Although the focal length of each of the first converging lenses 1005A and 1005B is half the focal length of the second converging lens 1015 in this embodiment, the focal length of each of the first converging lenses 1005A and 1005B may alternatively be twice the focal length of the second converging lens 1015. In this case, the light beams that have passed twice through the first converging lenses 1005A and 1005B become separated from one another by a distance 2 L (i.e., the distance between the first light beam 1032AA and the second light beam 1032BA and the distance between the third light beam 1032AB and the fourth light beam 1032BB). After passing through the second polarization beam splitter 1009, the four light beams ultimately become separated from one another by a distance L.

In each of the above embodiments, similar advantages can be achieved by using either a continuous light source or a pulsed light source. Thus, light in an arbitrary state can be made into multiple beams in accordance with the intended use of the optical device.

In each of the above embodiments, an image-acquisition device having a plurality of pixels, such as a CCD or a CMOS, may be used as the detecting unit. However, since there is no temporal overlapping of signal light from a subject, a signal may be detected continuously by using a single detecting unit, such as a photodiode (PD) or a photomultiplier tube (PMT). This is advantageous in that the detecting unit can be reduced in size and cost.

In each of the above embodiments, the optical scanning rate of the scanning unit, such as a resonant galvanometer mirror, can be further increased. For example, by splitting a beam from the light source into two or four optical paths, as in the above-described examples, the scanning rate can be increased to two times or four times the scanning rate achieved by using a resonant galvanometer mirror in the related art alone. Furthermore, each of the above embodiments is advantageous in that, with a simple configuration obtained by simply adding a splitting unit that splits a beam into two optical paths, the above-described advantages can be maintained, and at the same time, the scanning rate can be further increased.

Furthermore, in the above embodiment, a polarization switching element that instantaneously switches the polarization direction, such as a photoelastic element or an electro-optic crystal, may be used as each of the first polarization adjusting element 1001 and the second polarization adjusting element 1021. In this case, a control unit that controls the polarization-direction switching timing and the scanning timing of the scanner (scanning unit) may be provided, as in the fifth embodiment. Consequently, an improved scanning rate can be achieved without causing the utilization efficiency of the beam to decrease.

The present invention is not limited to a laser-scanning fluorescence microscope described in the above embodiments and may be applied to other light-beam-scanning observation apparatuses, such as a laser-scanning endoscope. Thus, a biological organism, such as a cell or tissue, can be observed in real time. Furthermore, if the present invention is optically designed to control beams so that they have identical optical-path lengths, as in the above-described examples, a configuration that can change the optical-path lengths to desired values in accordance with the intended usage (e.g., zooming or changing the observation magnification), as shown in FIG. 3, is also possible. Furthermore, although the above-described examples are directed to a configuration in which optical scanning is performed in the X-Y directions, a configuration in which optical scanning is performed over a scan region including a Z direction (e.g., X-Z directions, Y-Z directions, or X-Y-Z directions) is also possible.

Figure 6:
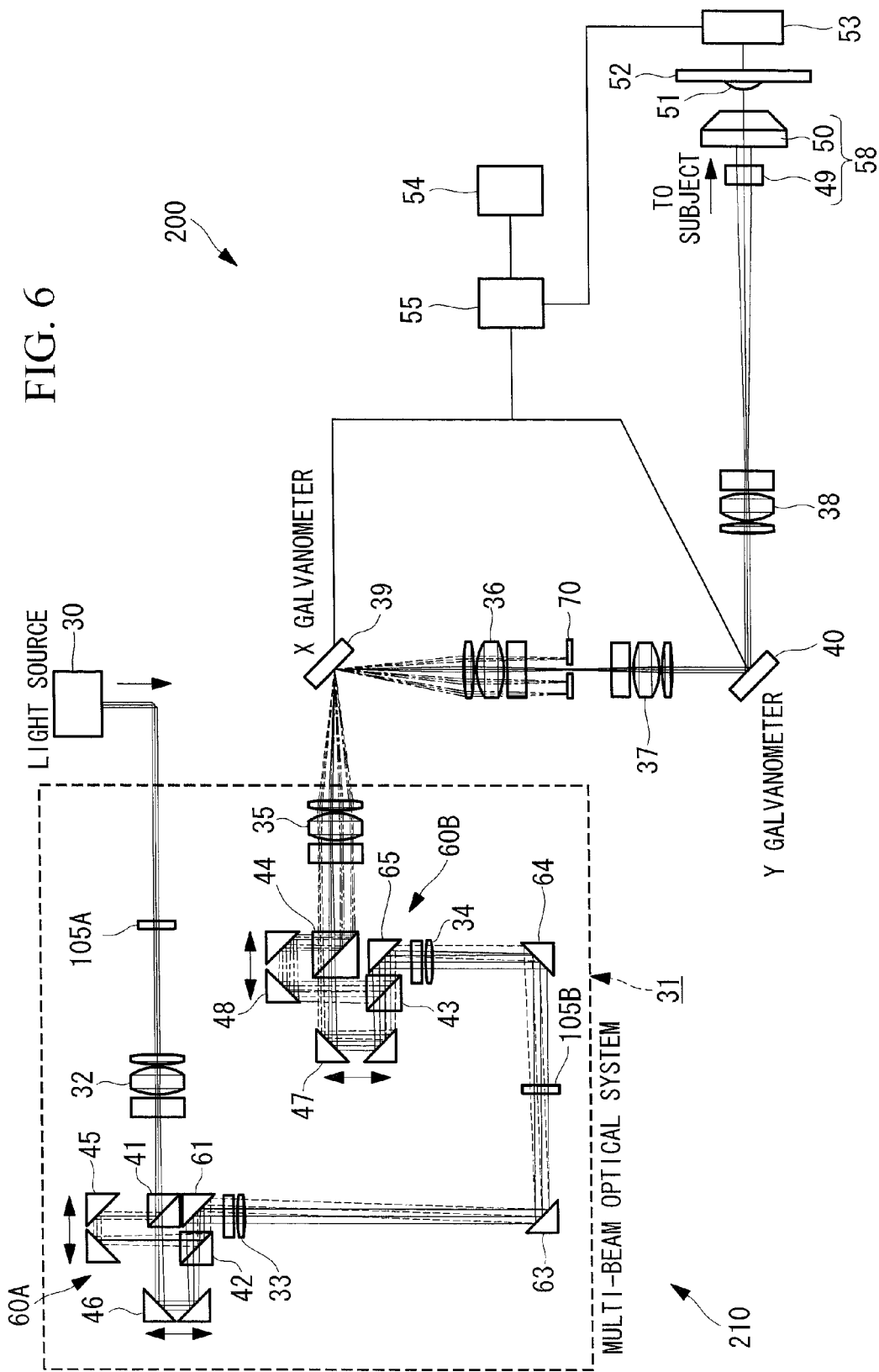
FIG. 6 schematically illustrates the configuration of an optical scanning device according to a third embodiment of the present invention.

Furthermore, if the present invention is optically designed to control beams so that they have identical optical-path lengths, as in the above-described examples, a configuration that can change the optical-path lengths to desired values in accordance with the intended usage (e.g., zooming or changing the observation magnification), as shown in FIG. 6, is also possible.

Furthermore, if the present invention is optically designed to control beams so that they have identical optical-path lengths, as in the above-described examples, a configuration that can change the distances among light beams to desired values in accordance with the intended usage (e.g., zooming or changing the observation magnification), as shown in FIG. 10, is also possible.

Although the embodiments of the present invention have been described above in detail with reference to the drawings, specific configurations are not to be limited to the above embodiments, and the prevent invention may include design modifications without departing from the scope of the invention. For example, the present invention is not limited to the embodiments and the modifications described above and may be applied to embodiments achieved by appropriately combining these embodiments and modifications; it is not limited in particular. For example, as an alternative to the third and seventh embodiments in which two sets consisting of splitting units and beam-angle setting units are used to split a beam into four optical paths, a combination of three or more sets consisting of these splitting units and beam-angle setting units is also possible.

In the fifth embodiment, the light-intensity detector 607 detects the intensity of each beam, and the control unit 608 controls the adjustment of the beam polarization direction performed by the half-wave plate 601. Alternatively, for example, a user may detect the intensity of each beam by using an intensity detector (not shown) and may manually adjust the rotation angle of the half-wave plate 601 around the optical axis on the basis of the detection result so as to adjust the polarization direction of each beam.

The following aspects of the invention are derived from the above embodiments.

A first aspect of the present invention provides an optical scanning device including a polarization switching unit that switches a polarization direction of a laser beam at a predetermined switching timing; at least one splitting unit that splits the laser beam into two optical paths in accordance with the polarization direction switched by the polarization switching unit; a beam-angle setting unit that causes the laser beams split by the splitting unit to have relative angles in a single plane so as to make the laser beams meet at a single location; and a scanning unit that scans the laser beams made to meet at the single location by means of the beam-angle setting unit in a direction parallel to the plane in synchronization with the switching timing.

According to the first aspect, the laser beams split into two optical paths by the splitting unit in accordance with the polarization direction switched by the polarization switching unit are made to meet at the same location and at different angles in the same plane by means of the beam-angle setting unit and are scanned by the scanning unit in the direction parallel to the plane.

In this case, the scanning unit scans the laser beams in synchronization with the polarization-direction switching timing of the polarization switching unit so that the split laser beams can be sequentially scanned over the same area at certain time intervals in accordance with their angles of incidence on the scanning unit. Furthermore, by using the splitting unit to split the laser beam in accordance with the polarization direction, the intensity of each split laser beam can be maintained at the same level as the intensity of the laser beam before it is split. Consequently, by instantaneously and successively switching the polarization direction of the laser beam by means of the polarization switching unit, an improved scanning rate can be achieved without causing the utilization efficiency of the laser beam to decrease.

In the first aspect, the beam-angle setting unit may include two or more fixed mirrors that are integrally movable in an incident direction of the laser beams in a state where the fixed mirrors are fixed at predetermined angles while facing the splitting unit. The fixed mirrors may sequentially reflect the laser beams split by the splitting unit so as to deflect the laser beams by a predetermined distance.

With this configuration, the optical-path lengths of the laser beams to be deflected can be changed simply by integrally moving the fixed mirrors in the incident direction of the laser beams. Consequently, the optical-path lengths of the two laser beams to be scanned by the scanning unit can be readily made equal to each other.

In the above-described configuration, the beam-angle setting unit may include a beam splitter that transmits or reflects each of the laser beams and makes the laser beams parallel to each other, and a lens that causes the laser beams made parallel to each other by the beam splitter to meet. The fixed mirrors may make the deflected laser beams enter different locations on the beam splitter.

With this configuration, the beam splitter transmits or reflects each of the laser beams deflected by the fixed mirrors and incident at different locations on the beam splitter and makes the laser beams parallel to each other. Then, the lens causes the laser beams to meet. Thus, the optical-path lengths of the laser beams traveling along multiple optical paths at different timings can be made equal to each other, and at the same time, the laser beams can be readily made to meet at the same location and at different angles of incidence in the same plane.

The optical scanning device according to the first aspect may further include another scanning unit that scans the laser beams scanned by the scanning unit in a direction orthogonal to a scanning direction of the scanning unit.

With this configuration, the laser beams scanned continuously over the same area in one direction by the scanning unit can be sequentially scanned by the other scanning unit in the direction orthogonal to the aforementioned direction, thereby allowing for an improved two-dimensional scanning rate of the laser beams.

A second aspect of the present invention provides a scanning inspection apparatus including the aforementioned optical scanning device; an observation optical system that radiates the laser beams scanned by the optical scanning device onto a subject; and a detecting unit that detects light from the subject irradiated with the laser beams from the observation optical system.

According to the second aspect, the laser beams radiated onto the subject by the observation optical system can be two-dimensionally scanned over the subject at an increased scanning rate by the optical scanning device. Therefore, an observation area of the subject can be observed within a short period of time on the basis of the light from the subject detected by the detecting unit.

In the second aspect, the apparatus may further include a reconstructing unit that links the light from the subject detected by the detecting unit with scan positions of the laser beams so as to reconstruct the light in the form of two-dimensional information or three-dimensional information; and a display unit that displays the two-dimensional information or the three-dimensional information reconstructed by the reconstructing unit.

With this configuration, the subject can be observed by viewing the two-dimensional information or three-dimensional information of the subject displayed on the display unit.

A third aspect of the present invention provides an optical scanning device including at least one splitting unit that splits an input laser beam into two optical paths; a beam-angle setting unit that causes the laser beams split by the splitting unit to have relative angles in a single plane so that the laser beams have identical optical-path lengths and are made to meet at a single location; and a scanning unit that simultaneously scans the laser beams made to meet at the single location by means of the beam-angle setting unit in a direction parallel to the plane.

According to the third aspect, the laser beams split into two optical paths by the splitting unit are made to meet at the same location and at different angles in the same plane by means of the beam-angle setting unit and are simultaneously scanned by the scanning unit in the direction parallel to the plane. Thus, with a single scanning process of the scanning unit, the split laser beams can be sequentially scanned over the same area at certain time intervals in accordance with their angles of incidence on the scanning unit.

In this case, the beam-angle setting unit causes the laser beams to be scanned by the scanning unit to have identical optical-path lengths so that the focal positions of the laser beams on the observation surface can be aligned with each other. Consequently, an improved scanning rate can be achieved while aligning the focal planes of the laser beams in a sample.

In the third aspect, the beam-angle setting unit may include two or more fixed mirrors that are integrally movable in an incident direction of the laser beams in a state where the fixed mirrors are fixed at predetermined angles while facing the splitting unit. The fixed mirrors may sequentially reflect the laser beams split by the splitting unit so as to deflect the laser beams by a predetermined distance.

With this configuration, the optical-path lengths of the laser beams to be deflected can be changed simply by integrally moving the fixed mirrors in the incident direction of the laser beams. Consequently, the optical-path lengths of the two laser beams to be scanned by the scanning unit can be readily made equal to each other.

In the above-described configuration, the beam-angle setting unit may include a beam splitter that transmits or reflects each of the laser beams and makes the laser beams parallel to each other, and a lens that causes the laser beams made parallel to each other by the beam splitter to meet. The fixed mirrors may make the deflected laser beams enter different locations on the beam splitter.

With this configuration, the beam splitter transmits or reflects each of the laser beams deflected by the fixed mirrors and incident at different locations on the beam splitter and makes the laser beams parallel to each other. Then, the lens causes the laser beams to meet. Thus, the optical-path lengths of multiple laser beams obtained by splitting a single laser beam can be made equal to each other, and at the same time, the laser beams can be readily made to meet at the same location and at different angles of incidence in the same plane.

In the third aspect, the device may further include a slit that limits an area through which the laser beams scanned by the scanning unit pass.

With this configuration, of the multiple laser beams scanned by the scanning unit, the laser beam scanned outside a predetermined area is blocked by the slit, so that a predetermined observation area can be continuously scanned by multiple laser beams sequentially passing through the slit at certain time intervals.

In the third aspect, the device may further include a polarization switching unit that switches a polarization direction of the laser beam to be incident on the splitting unit at a predetermined switching timing. The splitting unit may split the laser beam into the two optical paths in accordance with the polarization direction switched by the polarization switching unit, and the scanning unit may scan the laser beams in synchronization with the switching timing.

With this configuration, the splitting unit can split the laser beam while maintaining the intensity at the same level as that before it is split. In this case, the scanning unit scans the laser beams in synchronization with the polarization-direction switching timing of the polarization switching unit. Consequently, by instantaneously and successively switching the polarization direction of the laser beam by means of the polarization switching unit, an improved scanning rate can be achieved without causing the utilization efficiency of the laser beam to decrease.

In the third aspect, the device may further include a first polarization adjusting unit that is capable of adjusting a polarization-direction intensity ratio of the laser beam to be incident on the splitting unit for the first time; a re-entry mirror that causes the laser beams made parallel to each other for the first time by the beam splitter to enter the splitting unit from a direction different from the first time; and a second polarization adjusting unit that is capable of adjusting the polarization-direction intensity ratio of each of the laser beams that are made to re-enter the splitting unit by the re-entry mirror. The beam splitter may be a polarization beam splitter. The splitting unit may split the laser beam incident thereon for the first time into the two optical paths on the basis of the polarization-direction intensity ratio adjusted by the first polarization adjusting unit, and may split each of the laser beams incident on the splitting unit for the second time into two optical paths on the basis of the polarization-direction intensity ratio adjusted by the second polarization adjusting unit.

With this configuration, a beam emitted from a light source is split into two optical paths by the splitting unit on the basis of the polarization-direction intensity ratio adjusted by the first polarization adjusting unit. Subsequently, the laser beams are made to enter the splitting unit again from a direction different from the first time via the re-entry mirror and the second polarization adjusting unit. Then, each of these laser beams is further split into two optical paths by the splitting unit on the basis of the polarization-direction intensity ratio adjusted by the second polarization adjusting unit.

Therefore, a single light beam can be split into four light beams without having to provide an additional splitting unit and an additional beam-angle setting unit. Consequently, the scanning rate can be further improved, while realizing a device with a reduced size, a reduced number of components, and lower cost.

In the above-described configuration, the beam-angle setting unit may include a first converging lens that converges the laser beams that are split by the splitting unit and are to be incident on the fixed mirrors, and a second converging lens that converges the laser beams that are made parallel to each other for the first time by the beam splitter and whose polarization direction is to be adjusted by the second polarization adjusting unit. The two fixed mirrors may be integrally movable also in a direction orthogonal to the incident direction of the laser beams. A focal length of the first converging lens and a focal length of the second converging lens may be different from each other such that the focal length of the first converging lens is twice the focal length of the second converging lens or such that the focal length of the second converging lens is twice the focal length of the first converging lens.

With this configuration, by integrally moving the fixed mirrors in the direction orthogonal to the incident direction of the laser beams, the distances among four light beams that are made parallel to each other by the beam splitter can be changed while keeping them evenly spaced apart from one another. Thus, a zooming function can be achieved by simply moving the fixed mirrors, thereby allowing for a simplified operation.

The optical scanning device according to the third aspect may further include another scanning unit that scans the laser beams scanned by the scanning unit in a direction orthogonal to a scanning direction of the scanning unit.

With this configuration, the laser beams scanned continuously over the same area in one direction by the scanning unit can be sequentially scanned by the other scanning unit in the direction orthogonal to the aforementioned direction, thereby allowing for an improved two-dimensional scanning rate of the laser beams.

A fourth aspect of the present invention provides a scanning inspection apparatus including the aforementioned optical scanning device; an observation optical system that radiates the laser beams scanned by the optical scanning device onto a subject; and a detecting unit that detects light from the subject irradiated with the laser beams from the observation optical system.

According to the fourth aspect, the laser beams radiated onto the subject by the observation optical system can be two-dimensionally scanned over the subject at an increased scanning rate by the optical scanning device. Therefore, an observation area of the subject can be observed within a short period of time on the basis of the light from the subject detected by the detecting unit.

In the fourth aspect, the apparatus may further include a reconstructing unit that links the light from the subject detected by the detecting unit with scan positions of the laser beams so as to reconstruct the light in the form of two-dimensional information or three-dimensional information; and a display unit that displays the two-dimensional information or the three-dimensional information reconstructed by the reconstructing unit.

With this configuration, the subject can be observed by viewing the two-dimensional information or three-dimensional information of the subject displayed on the display unit.

A fifth aspect of the present invention provides an optical scanning device including a polarization-direction adjusting unit that is capable of adjusting a polarization direction of a laser beam; at least one splitting unit that splits the laser beam whose polarization direction has been adjusted by the polarization-direction adjusting unit into two optical paths of polarized components that are orthogonal to each other; a beam-angle setting unit that causes the laser beams split by the splitting unit to have relative angles in a single plane so as to make the laser beams meet at a single location; and a scanning unit that scans the laser beams made to meet at the single location by means of the beam-angle setting unit in a direction parallel to the plane.

According to the fifth aspect, the polarization-direction adjusting unit adjusts the polarization direction of the laser beam, and the splitting unit splits the laser beam into two optical paths of polarized components that are orthogonal to each other. Then, the beam-angle setting unit causes the split laser beams traveling along the respective optical paths to have relative angles in the same plane so as to make the laser beams meet at the same location. Subsequently, the scanning unit scans the laser beams in the direction parallel to the plane. Thus, with a single scanning process of the scanning unit, the split laser beams can be sequentially scanned over the same area at certain time intervals in accordance with their angles of incidence on the scanning unit.

In this case, the polarization-direction adjusting unit adjusts the polarization direction of the laser beam so that the polarized components to be obtained by splitting the laser beam into two optical paths by means of the splitting unit have substantially equal intensities. Thus, a scan surface can be scanned by using multiple laser beams with substantially the same brightness. Therefore, with a simple configuration, brightness variations on the scan surface can be prevented, and the scanning rate can be improved. Furthermore, since the light-intensity ratio between the split optical paths can be adjusted relatively freely, strict selection of optical elements is not necessary, which is advantageous in that the manufacturing cost and the troublesome task of alignment can be reduced.

In the fifth aspect, the device may further include a light-intensity detecting unit that detects the intensity of each of the laser beams split by the splitting unit; and a control unit that controls the adjustment of the polarization direction of the laser beam performed by the polarization-direction adjusting unit on the basis of the intensities of the laser beams detected by the light-intensity detecting unit so that the polarized components to be obtained by splitting the laser beam into the two optical paths by means of the splitting unit have substantially equal intensities.

With this configuration, the laser beam can be readily and quickly split into laser beams with equal intensities by means of the polarization-direction adjusting unit without requiring the user to perform a time-consuming task.

In the above-described configuration, the polarization-direction adjusting unit may be a half-wave plate that is rotatable around an optical axis of the laser beam and is capable of transmitting the laser beam.

With this configuration, by rotating the half-wave plate around the optical axis of the laser beam, the angle of polarization of an output laser beam relative to a main optical axis of the half-wave plate can be changed in accordance with the angle of polarization of an incident beam relative to the main optical axis. Therefore, the polarization direction of the laser beam can be adjusted by simply changing the rotation angle of the half-wave plate around the optical axis of the laser beam, whereby the ratio of polarized components of the laser beam to be split into two optical paths by the splitting unit can be changed.

In the fifth aspect, the device may further include a slit that limits an area through which the laser beams scanned by the scanning unit pass.

With this configuration, of the multiple laser beams scanned by the scanning unit, the laser beam scanned within a predetermined area can pass through the slit, whereas the laser beam scanned outside the predetermined area can be blocked by the slit. Therefore, a predetermined observation area can be continuously scanned by multiple laser beams sequentially passing through the slit at certain time intervals.

In the fifth aspect, the beam-angle setting unit may include two or more fixed mirrors that are provided in a movable manner in a state where the fixed mirrors are fixed at predetermined angles while facing the splitting unit. The fixed mirrors may sequentially reflect the laser beams split by the splitting unit so as to deflect the laser beams by a predetermined distance.

With this configuration, the optical-path lengths of the laser beams to be deflected can be changed by simply changing the positions of the fixed mirrors. Consequently, the optical-path lengths of the two laser beams to be scanned by the scanning unit can be readily made equal to each other, whereby an improved scanning rate can be achieved while aligning the focal planes of the laser beams in a sample.

In the above-described configuration, the beam-angle setting unit may include a beam splitter that transmits or reflects each of the laser beams and makes the laser beams parallel to each other, and a lens that causes the laser beams made parallel to each other by the beam splitter to meet. The fixed mirrors may make the deflected laser beams enter different locations on the beam splitter.

With this configuration, the beam splitter transmits or reflects each of the laser beams deflected by the fixed mirrors and incident at different locations on the beam splitter and makes the laser beams parallel to each other. Then, the lens causes the laser beams to meet. Thus, the optical-path lengths of the laser beams traveling along multiple optical paths at different timings can be made equal to each other, and at the same time, the laser beams can be readily made to meet at the same location and at different angles of incidence in the same plane.

The optical scanning device according to the fifth aspect may further include another scanning unit that scans the laser beams scanned by the scanning unit in a direction orthogonal to a scanning direction of the scanning unit.

With this configuration, the laser beams scanned continuously over the same area in one direction by the scanning unit can be sequentially scanned by the other scanning unit in the direction orthogonal to the aforementioned direction, thereby allowing for an improved two-dimensional scanning rate of the laser beams.

A sixth aspect of the present invention provides a scanning inspection apparatus including the aforementioned optical scanning device; an observation optical system that radiates the laser beams scanned by the optical scanning device onto a subject; and a detecting unit that detects light from the subject irradiated with the laser beams from the observation optical system.

According to the sixth aspect, the laser beams radiated onto the subject by the observation optical system can be two-dimensionally scanned over the subject at an increased scanning rate by the optical scanning device. Therefore, an observation area of the subject can be observed within a short period of time on the basis of the light from the subject detected by the detecting unit.

In the sixth aspect, the apparatus may further include a reconstructing unit that links the light from the subject detected by the detecting unit with scan positions of the laser beams so as to reconstruct the light in the form of two-dimensional information or three-dimensional information; and a display unit that displays the two-dimensional information or the three-dimensional information reconstructed by the reconstructing unit.

With this configuration, the subject can be observed by viewing the two-dimensional information or three-dimensional information of the subject displayed on the display unit.

REFERENCE SIGNS LIST 1, 1A, 1B, 105A, 105B polarization switching unit
2, 2A, 2B, 41, 43, 111 polarization beam splitter (splitting unit)
3 reflecting optical system (beam-angle setting unit)
13, 14, 45, 46, 47, 48 pair of mirrors (beam-angle setting unit)
13A first fixed mirror (beam-angle setting unit, fixed mirror)
13B second fixed mirror (beam-angle setting unit, fixed mirror)
14A third fixed mirror (beam-angle setting unit, fixed mirror)
14B fourth fixed mirror (beam-angle setting unit, fixed mirror)
16 collimating lens (beam-angle setting unit, lens)
5, 39, 40 scanner (scanning unit)
21, 70 slit
33, 35 relay lens (beam-angle setting unit, lens)
53 detecting unit
54 display unit
55, 125 control unit (reconstructing unit)
58 observation optical system
100, 110, 210 optical scanning device
112 polarization beam splitter (beam-angle setting unit)
200 scanning inspection apparatus
310 optical scanning device
311 beam splitter (splitting unit)
312 beam splitter
313, 314 pair of mirrors (beam-angle setting unit)
313A first fixed mirror (beam-angle setting unit, fixed mirror)
313B second fixed mirror (beam-angle setting unit, fixed mirror)
314A third fixed mirror (beam-angle setting unit, fixed mirror)
314B fourth fixed mirror (beam-angle setting unit, fixed mirror)
316 collimating lens (beam-angle setting unit, lens)
319 scanner (scanning unit)

323 slit
601, 601A, 601B, 601C, 601D half-wave plate (polarization-direction adjusting unit)
602, 602A, 602B, 602C, 602D polarization beam splitter (splitting unit)
603 reflecting optical system (beam-angle setting unit)
605 scanner (scanning unit)
606 slit
607 light-intensity detector (light-intensity detecting unit)
608 control unit
613, 614 pair of mirrors (beam-angle setting unit)
613A first fixed mirror (beam-angle setting unit, fixed mirror)
613B second fixed mirror (beam-angle setting unit, fixed mirror)
613C pair of mirrors (beam-angle setting unit)
613D pair of mirrors (beam-angle setting unit)
614A third fixed mirror (beam-angle setting unit, fixed mirror)
614B fourth fixed mirror (beam-angle setting unit, fixed mirror)
614C pair of mirrors (beam-angle setting unit)
614D pair of mirrors (beam-angle setting unit)
615, 615C, 615D polarization beam splitter (beam-angle setting unit)
616 collimating lens (beam-angle setting unit, lens)
616C, 616D relay lens (beam-angle setting unit, lens)
638 scanner (another scanning unit)
653 detecting unit
654 reconstructing unit
655 display unit
658 observation optical system
700, 800, 900, 1000 optical scanning device
901 scanning inspection apparatus
1001 first polarization adjusting element (polarization adjusting unit)
1003 first polarization beam splitter (splitting unit)
1007A, 1007B movable mirror (beam-angle setting unit)
1009 second polarization beam splitter (beam-angle setting unit)
1011 mirror (re-entry mirror)
1013 mirror (re-entry mirror)
1017 mirror (re-entry mirror)
1019 mirror (re-entry mirror)
1021 second polarization adjusting element (polarization adjusting unit)

The invention claimed is:

1. An optical scanning device comprising:
at least one splitting unit that splits an input laser beam into two optical paths;
a beam-angle setting unit that causes the laser beams split by the splitting unit to have relative angles in a single plane so that the laser beams have identical optical-path lengths and are made to meet at a single location; and
a scanning unit that simultaneously scans the laser beams made to meet at the single location by means of the beam-angle setting unit in a direction parallel to the plane;
wherein the beam-angle setting unit includes two or more fixed mirrors that are integrally movable in an incident direction of the laser beams in a state where the fixed mirrors are fixed at predetermined angles while facing the splitting unit, and
the fixed mirrors sequentially reflect the laser beams split by the splitting unit so as to deflect the laser beams by a predetermined distance.

2. The optical scanning device according to claim 1,
wherein the beam-angle setting unit includes a beam splitter that transmits or reflects each of the laser beams and makes the laser beams parallel to each other, and a lens that causes the laser beams made parallel to each other by the beam splitter to meet, and
wherein the fixed mirrors make the deflected laser beams enter different locations on the beam splitter.

3. The optical scanning device according to claim 2, further comprising:
a first polarization adjusting unit that is capable of adjusting a polarization-direction intensity ratio of the laser beam to be incident on the splitting unit for the first time;
a re-entry mirror that causes the laser beams made parallel to each other for the first time by the beam splitter to enter the splitting unit from a direction different from the first time; and
a second polarization adjusting unit that is capable of adjusting the polarization-direction intensity ratio of each of the laser beams that are made to re-enter the splitting unit by the re-entry mirror,
wherein the splitting unit splits the laser beam incident thereon for the first time into the two optical paths on the basis of the polarization-direction intensity ratio adjusted by the first polarization adjusting unit, and splits each of the laser beams incident on the splitting unit for the second time into two optical paths on the basis of the polarization-direction intensity ratio adjusted by the second polarization adjusting unit, and
wherein the beam splitter is a polarization beam splitter.

4. The optical scanning device according to claim 3,
wherein the beam-angle setting unit includes a first converging lens that converges the laser beams that are split by the splitting unit and are to be incident on the fixed mirrors, and a second converging lens that converges the laser beams that are made parallel to each other for the first time by the polarization beam splitter and whose polarization direction is to be adjusted by the second polarization adjusting unit,
wherein the two fixed mirrors are integrally movable also in a direction orthogonal to the incident direction of the laser beams, and
wherein a focal length of the first converging lens and a focal length of the second converging lens are different from each other such that the focal length of the first converging lens is twice the focal length of the second converging lens or such that the focal length of the second converging lens is twice the focal length of the first converging lens.

5. A scanning inspection apparatus comprising:
the optical scanning device according to claim 3;
an observation optical system that radiates the laser beams scanned by the optical scanning device onto a subject; and
a detecting unit that detects light from the subject irradiated with the laser beams from the observation optical system.

6. The scanning inspection apparatus according to claim 5, further comprising:
a reconstructing unit that links the light from the subject detected by the detecting unit with scan positions of the laser beams so as to reconstruct the light in the form of two-dimensional information or three-dimensional information; and
a display unit the displays the two-dimensional information or the three-dimensional information reconstructed by the reconstructing unit.

7. The optical scanning device according to claim 1, further comprising:
a slit that limits an area through which the laser beams scanned by the scanning unit pass.

8. The optical scanning device according to claim 1, further comprising:
another scanning unit that scans the laser beams scanned by the scanning unit in a direction orthogonal to a scanning direction of the scanning unit.

9. An optical scanning device comprising:
at least one splitting unit that splits an input laser beam into two optical paths;
a beam-angle setting unit that causes the laser beams split by the splitting unit to have relative angles in a single plane so that the laser beams have identical optical-path lengths and are made to meet at a single location;
a scanning unit that simultaneously scans the laser beams made to meet at the single location by means of the beam-angle setting unit in a direction parallel to the plane;
a polarization switching unit that switches a polarization direction of the laser beam to be incident on the splitting unit at a predetermined switching timing,
wherein the splitting unit splits the laser beam into the two optical paths in accordance with the polarization direction switched by the polarization switching unit, and
wherein the scanning unit scans the laser beams in synchronization with the switching timing.

10. An optical scanning device comprising:
at least one splitting unit that splits an input laser beam into two optical paths;
a beam-angle setting unit that causes the laser beams split by the splitting unit to have relative angles in a single plane so that the laser beams have identical optical-path lengths and are made to meet at a single location; and
a scanning unit that simultaneously scans the laser beams made to meet at the single location by means of the beam-angle setting unit in a direction parallel to the plane;
wherein the beam-angle setting unit includes a beam splitter that transmits or reflects each of the laser beams and makes the laser beams parallel to each other, and a lens that causes the laser beams made parallel to each other by the beam splitter to meet, and
wherein the beam-angle setting unit makes the deflected laser beams enter different locations on the beam splitter.

* * * * *